United States Patent
Jones et al.

(10) Patent No.: US 11,543,693 B2
(45) Date of Patent: Jan. 3, 2023

(54) OPTICAL ELEMENTS

(71) Applicant: Merck Patent GmbH, Darmstadt (DE)

(72) Inventors: John Clifford Jones, Leeds (GB);
Markus Wahle, Leeds (GB)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 17/255,903

(22) PCT Filed: Jun. 27, 2019

(86) PCT No.: PCT/GB2019/051828
§ 371 (c)(1),
(2) Date: Dec. 23, 2020

(87) PCT Pub. No.: WO2020/002930
PCT Pub. Date: Jan. 2, 2020

(65) Prior Publication Data
US 2021/0240032 A1 Aug. 5, 2021

(30) Foreign Application Priority Data
Jun. 27, 2018 (GB) .................................... 1810565

(51) Int. Cl.
*G02F 1/1333* (2006.01)
*G02F 1/1343* (2006.01)

(52) U.S. Cl.
CPC .. *G02F 1/133371* (2013.01); *G02F 1/134309* (2013.01); *G02F 2203/06* (2013.01)

(58) Field of Classification Search
CPC ......... G02F 1/133371; G02F 1/134309; G02F 2203/06; G02F 1/294; G02F 1/29
See application file for complete search history.

(56) References Cited

U.S. PATENT DOCUMENTS

| 7,466,485 B2 | 12/2008 | Woodgate et al. |
| 7,710,535 B2 | 5/2010 | Nomura et al. |

(Continued)

FOREIGN PATENT DOCUMENTS

| EP | 1768116 A1 | 3/2007 |
| GB | 2403813 A | 1/2005 |

(Continued)

OTHER PUBLICATIONS

International Search Report PCT/GB2019/051828 dated Sep. 17, 2019 (pp. 1-4).

*Primary Examiner* — Mariam Qureshi
(74) *Attorney, Agent, or Firm* — Millen White Zelano and Branigan, PC; Csaba Henter

(57) ABSTRACT

An electrically switchable optical modulator for modulating an optical wavefront transmitted therethrough, comprising a birefringent first optical element and a birefringent second optical element each having respective ordinary and extraordinary refractive indices. A birefringent liquid crystal material is sandwiched between the first and second optical elements. The extraordinary refractive index of the liquid crystal material is electrically switchable between: a first state in which it has a first value; and, a second state in which it has a second value different from the first value. One or both of the first value and the second value is un-matched to the extraordinary refractive index of the first optical element in respect of light polarised in a first direction of linear polarisation, and is un-matched to the extraordinary refractive index of the second optical element in respect of light polarised in a second direction of linear polarisation orthogonal to the first direction. This switchably renders a relative contrast in extraordinary refractive index as between the liquid crystal material and the first and second optical elements for modulating said wavefront.

22 Claims, 23 Drawing Sheets

FIG. 1A

(56) References Cited

U.S. PATENT DOCUMENTS

| | | | | |
|---|---|---|---|---|
| 2005/0041307 A1* | 2/2005 | Barone | ................... | G02B 3/08 |
| | | | | 359/742 |
| 2007/0182915 A1* | 8/2007 | Osawa | .............. | G02F 1/133526 |
| | | | | 349/201 |
| 2013/0101755 A1* | 4/2013 | Lee | ................... | G02F 1/133707 |
| | | | | 427/532 |
| 2015/0378076 A1* | 12/2015 | Gam | ................... | G02B 5/3033 |
| | | | | 349/193 |
| 2018/0284440 A1* | 10/2018 | Popovich | ................ | G02F 1/292 |

FOREIGN PATENT DOCUMENTS

| | | | |
|---|---|---|---|
| GB | 2410339 | A | 7/2005 |
| JP | 62170934 | A | 7/1987 |
| WO | 2020002930 | A1 | 1/2020 |

* cited by examiner

OPTICAL ELEMENTS

FIELD

The invention relates to optical elements or components, such as diffractive and/or refractive optical elements or components. The invention relates to optical or components that are electrically switchable in their diffractive and/or refractive optical effect. The invention relates to optical elements or components comprising an electrically switchable liquid crystal material.

BACKGROUND

There exists a need to provide polarisation independent switchable optical modulator devices, such as lenses, optical beam steerers and diffraction gratings or holograms. These would be highly desirable components for applications in smartphones, medical imaging, and photovoltaics. Desired properties are fast switching, polarisation independence, low power consumption and low cost scalable production potential. Polarisation independence enables an optical modulator to apply a desired optical modulation to unpolarised light which is insensitive to the inherent presence of two orthogonal polarisation components within all unpolarised light. That is to say, any unpolarised light may be decomposed in to two equal components of linearly polarised light, one component being polarised in a direction orthogonal to the other component or with the opposite handedness if circularly or elliptically polarised.

Existing approaches to try to provide polarisation independence in optical modulators include physically separating unpolarised light into its two polarised components, and then processing each component separately before returning the two processed components together again. Such methods often employ systems using two optical processing trains/devices arranged in parallel—one optical train/device for each respective one of the two orthogonal polarisation states of unpolarised light. This sort arrangement is often found in 3D displays and projectors whereby the two orthogonal polarisation components in a light beam are split using a polarisation beam-splitter (PBS) and directed on to separate optical processing devices arranged alongside each other, for parallel optical processing appropriate to the respective polarisation state, before being brought back together (e.g. on a screen).

Alternatively, two separate optical components, each operating on a respective one of the orthogonal polarisations, may be arranged in series. These may be mounted together and coupled using index matching fluid or adhesive. However, arrangements such as this suffer from issues with parallax, as between the two separate optical components, which is particularly important to avoid in lens systems. Such arrangements are not suitable for some applications, such as beam steerers etc. If other optical elements are needed in series, in order to mitigate these parallax issues, then this can quickly become an impractical arrangement.

These arrangements, whether parallel or series arrangements of optical elements, are expensive, complex and relatively bulky. They require duplication of components in order to duplicate optical processing upon each of the two orthogonal polarisation states of unpolarised light. The present invention provides an alternative.

SUMMARY

In a first aspect, the invention may provide an electrically switchable optical modulator for modulating an optical wavefront transmitted therethrough, comprising: a birefringent first optical element and a birefringent second optical element each having respective ordinary and extraordinary refractive indices; a birefringent liquid crystal material sandwiched between the first and second optical elements; wherein the extraordinary refractive index of the liquid crystal material is electrically switchable between: a first state in which it has a first value; and a second state in which it has a second value different from the first value. One or both of the first value and the second value is (or are) un-matched to the extraordinary refractive index of the first optical element in respect of light polarised in a first direction of linear polarisation, and is (or are) un-matched to the extraordinary refractive index of the second optical element in respect of light polarised in a second direction of linear polarisation orthogonal to the first direction, thereby to switchably render a relative contrast in extraordinary refractive index as between the liquid crystal material and the first and second optical elements for modulating said wavefront. The first and second values of the extraordinary refractive index of the liquid crystal material may be the respective average values, or bulk values of the body of the liquid crystal material as a whole.

In this way, by controlling the component of the birefringence of the liquid crystal sandwiched between the optical elements in the direction of light propagation, one is able to cause the first of the two optical elements to acquire an optical modulating function in respect of one polarisation component/state of light, and to simultaneously cause the second of the two optical elements to acquire an optical modulating function in respect of the other (transverse) polarisation component/state of light. Optical modulating functions include, but are not limited to: lensing; focussing; defocussing; refracting, diffracting; beam steering. Preferably the optical modulation function, effect or action of the first optical element is substantially the same as the modulation function, effect or action of the second optical element (e.g. both act as lenses, prisms, or diffraction gratings, which modulate a respective wave front so as to focus light or to diffract respective polarisation components of light substantially in the same way with substantially the same result). As a consequence, the optical modulator may provide a switchable optical modulator the net action or effect of which is substantially independent of the polarisation state of the light incident upon it. The invention substantially avoids, or mitigates, parallax issues suffered by prior art series optical arrangements, by allowing that both polarisations are operated upon by a single device.

As with all liquid crystal optical devices, the optical modulator of the invention comprises two surfaces, and is arranged such that one surface acts on one optical polarisation state and the other acts on the orthogonal optical polarisation state.

Desirably, pleochroic dyes may be included in the liquid crystal material. The liquid crystal material may comprise elements that absorb one polarisation more than others for a certain wavelength range. In such instances, the optical modulation may be made deliberately wavelength dependent, so that one wavelength band is modulated as required and a different wavelength band does not undergo optical modulation or undergoes a different optical modulation Desirably, the first value is matched to the respective extraordinary refractive indices of both the first and second optical elements. Accordingly, the optical modulator may be switchable between a state in which it has substantially no effective modulating influence on incident light (e.g. the first state) because substantially no effective refractive index contrast exists between the liquid crystal material and the optical elements around it, and a state (e.g. the second state) in which such contrast exists. If neither of the first value and the second value is matched to the respective extraordinary refractive indices of either of the first and second optical elements, then the optical modulator is operable to switch between states which induce different respective contrasts in extraordinary refractive index as between the liquid crystal and the two optical elements. Desirably, the ordinary refractive index of the liquid crystal material is matched to the respective ordinary refractive indices of both the first and second optical elements. It is to be understood, and will be readily apparent to the skilled person, that the value of the refractive index of a material is typically wavelength-dependent (i.e. the optical material exhibits dispersion). To this extent, references herein to refractive indices being "matched" or "un-matched" may refer to a condition that arises for wavelengths or electromagnetic radiation which at least fall within an operating spectrum/band of the optical modulator. Preferably, one refractive index value may be considered to be "matched" to another refractive index value if the two values in question agree (i.e. do not differ) to within 2 decimal places of each other. For example, a first refractive index value may be a decimal value: a.bcd, where each of a, b, c and d are integer values, and a second refractive index value may be a decimal value: $\alpha.\beta\gamma\delta$, where $\alpha$, $\beta$, $\gamma$, and $\delta$ are each integers. These two refractive index values may be considered to be "matched" to within 2 decimal places when: $a=\alpha$, $b=\beta$, $c=\gamma$, and d need not (but may) equal $\delta$. This may apply, for birefringent materials, to either or both the extraordinary refractive index $n_e$ and or the ordinary refractive index $n_o$. More preferably one refractive index value may be considered to be "matched" to another refractive index value if the two values in question agree to within (i.e. differ by not more than)+/−0.005. Still more preferably, one refractive index value may be considered to be "matched" to another refractive index value if the two values in question agree to within a third decimal place. However, the inventors have found that satisfactory operation can be achieved when the indices are less closely matched.

In the second state the extraordinary refractive index of the liquid crystal material may differ from the extraordinary refractive index of the first optical element in respect of light polarised in a first direction of linear polarisation. In the second state the extraordinary refractive index of the liquid crystal material may differ from the extraordinary refractive index of the second optical element in respect of light polarised in a second direction of linear polarisation orthogonal to the first direction.

In the first state the extraordinary refractive index of the liquid crystal material may differ from, or may be substantially the same as (e.g. 'matched' with), the extraordinary refractive index of the first optical element in respect of light polarised in a first direction of linear polarisation. In the first state the extraordinary refractive index of the liquid crystal material may differ from, or may be substantially the same as (e.g. 'matched' with), the extraordinary refractive index of the second optical element in respect of light polarised in a second direction of linear polarisation orthogonal to the first direction.

As a result, the optical modulator is able to switchably render a relative contrast (or a change from one contrast to another, different contrast) in extraordinary refractive index as between the liquid crystal material and the first and second optical elements for modulating said wavefront.

The extraordinary refractive index of the liquid crystal material may be electrically switchable between a first state in which it is matched to the respective extraordinary refractive indices of both the first and second optical elements and, a second state. In the second state the extraordinary refractive index of the liquid crystal material may be un-matched to the extraordinary refractive index of the first optical element in respect of light polarised in a first direction of linear polarisation. It may also be un-matched to the extraordinary refractive index of the second optical element in respect of light polarised in a second direction of linear polarisation orthogonal to the first direction.

Desirably, the ordinary refractive index of the liquid crystal material is matched to the respective ordinary refractive indices of both the first and second optical elements.

Desirably, the first and second optical elements are formed from birefringent polymer material (e.g. formed using a reactive mesogen material) and may each define a respective director, wherein the director of the first optical element is transverse to the director of the second optical element.

Desirably, the liquid crystal material is a nematic liquid crystal material, whereby when in said first state the optic axis of the liquid crystal material: is aligned substantially parallel to the director of the first optical element; and, is aligned substantially parallel to the director of the second optical element. Desirably, the first and second optical elements are arranged, relative to each other, to define a 90° twisted configuration within the nematic liquid crystal between the optical elements.

A long pitch cholesteric may be added to the nematic so that the pitch is many times greater than the thickness of the body of liquid crystal (i.e. the separation between optical elements, the cell gap), but the handedness of tilt and twist are substantially maintained for both states without unwanted scattering defects.

Desirably, the first optical element and the second optical element each comprise a birefringent polymer material (e.g. formed using a reactive mesogen material). The first and second optical elements may be formed from a reactive mesogen cured from a reactive state to form a birefringent polymer.

A twisted nematic (TN) liquid crystal material is beneficial because it will work well for a wide set of angles of indicence of light (relative to the optical axis of the modulator), and across a wide spectrum wavelengths of electromagnetic radiation. It is also relatively insensitive to the variations/changes that may arise in the thickness of the liquid crystal cell due to the structured surface relief patterns on the first and second optical elements between which it is sandwiched (e.g. when inverse surface structures are not used).

The optical modulator may be configured to provide a half-wave plate. The liquid crystal material may be arranged such that the directors are preferably parallel to one another across the cell, but the cell gap and birefringence are arranged to give a half wave retardation for the incident light. This causes both polarisations to reorient through 90° and hence achieve the desired result. Alignment of the liquid crystal material at a surface (e.g. an RM surface) of one or both optical elements may be achieved by providing a separate alignment layer with a strong anchoring energy to the surface (e.g. to the top layer of that RM surface). With a TN liquid crystal arrangement, together with optical elements presenting an RM surface, the director of the liquid crystal is required to follow that of the RM and so the correct alignment is automatically supported.

Desirably, one or each of the first and second optical elements presents a curved surface to which said liquid crystal material complies.

Desirably, one or each of the first and second optical elements presents a surface relief pattern to which the bulk shape of the liquid crystal material complies.

Desirably, each of the first and second optical elements presents a surface relief pattern to which the bulk shape of the liquid crystal material complies. By complying to the surface relief pattern, it is meant that the liquidity of the liquid crystal material is able to follow the surface relief shape intimately, achieving contact with the surface of the relief pattern substantially continuously across that surface and substantially without leaving gaps between the liquid of the liquid crystal material and the surface of the surface relief pattern. The property of liquidity of the material may be temperature dependent. For example, this may apply when the optical modulator is designed to operate with a ferroelectric smectic liquid crystal material.

In such instances, the liquid crystal may have been brought into compliance with the surface relief pattern or surface shape of the first/second optical element at an elevated temperature, being a temperature above that at which the liquid crystal is designed to operate normally, or optimally. For example, the liquid crystal may have been introduced into the condition of compliance to the surface relief pattern or surface shape of the first/second optical element at a temperature where it is an isotropic liquid or nematic liquid crystal during the manufacturing step and cooled to the lower temperature liquid crystal phase for operation.

Desirably, each of the first and second optical elements presents a surface relief pattern to which the bulk shape of the liquid crystal material complies, wherein the pattern presented by the first optical element is the reciprocal of (e.g. the inverse or complementary shape of) the pattern presented by the second optical element.

Desirably, each of the first and second optical elements presents a surface relief pattern to which said liquid crystal material complies, wherein the pattern presented by the first optical element is substantially the same as the pattern presented by the second optical element.

Desirably, the first optical element opposes the second optical element. One or both optical elements may comprise a substantially planar substrate at a surface of which the respective surface relief pattern is formed. The substrate may be non-birefringent and the surface relief pattern may be formed from a birefringent material deposited upon a surface of either substrate. Alternatively, the planar substrate may be birefringent as a whole (e.g. formed from material having birefringence).

Desirably, the first optical element defines a first optical axis and the second optical element defines a second optical element that is substantially coaxial with the first optical axis.

Desirably, one or both of the optical elements is shaped to define an axis of cylindrical symmetry which is substantially perpendicular to a flat surface disposed on one side of the respective optical element. Preferably, both of the optical elements are shaped to define a respective said axis of cylindrical symmetry and the axis of cylindrical symmetry of the first and second optical elements are coaxial.

Desirably, the liquid crystal material is disposed between two separate electrodes configured to support between them an electrical field for switching the extraordinary refractive index of the liquid crystal material from said first state to said second state. The liquid crystal material may be electrically switchable between a state in which the local directors thereof are substantially homeotropically aligned, and a state in which successive local directors thereof progressively twist in alignment to define a twisted nematic state. The thickness of the liquid crystal material sandwiched between the first and second optical elements, may be substantially equal to one quarter of the pitch length of one 360 degrees twist in the local director thereof.

The first state of the extraordinary refractive index of the liquid crystal material, may correspond to a twisted nematic state of the liquid crystal material in which the local directors of the liquid crystal material are substantially transverse (e.g. perpendicular) to the optical axes of the first and second optical elements. The second state of the extraordinary refractive index of the liquid crystal material, may correspond to a homeotropically aligned state of the liquid crystal material in which the local directors of the liquid crystal material are substantially aligned along (e.g. parallel) to the optical axes of the first and second optical elements.

Desirably, one or each of the first optical element and the second optical element is disposed between the two separate electrodes.

The optical modulator may include, or may be configured to include, a voltage unit disposed in electrical connection with both of the first and second electrodes and configured to switchably apply a predetermined voltage (V) between the two electrodes therewith to generate an electrical field which is directed across the liquid-crystal material of the optical modulator. The two electrodes may be arranged such that the electric field is directed in a direction substantially parallel to the shared optical axis of one or both of the first and second optical elements.

Desirably, one of the two separate electrodes is disposed between the first optical element and the liquid crystal material.

Desirably, one of the two separate electrodes is disposed between the second optical element and the liquid crystal material.

One or both optical elements may comprise a substrate at a surface of which the respective surface relief pattern is formed. The substrate may be non-birefringent and the surface relief pattern may be formed from a birefringent material deposited upon a surface of eth substrate. An aforesaid electrode may be disposed at the surface of the substrate and the surface relief pattern may be disposed at/on a surface of the electrode. An aforesaid electrode may be disposed at the surface of the surface relief pattern or of both the surface of the surface relief pattern exposed surfaces of the substrate if such exist between elements of the surface relief pattern.

A calamitic reactive mesogen (RM) may be used to form the birefringent optical elements. A calamitic nematic liquid crystal may be used as the liquid crystal material sandwiched between them, in optical contact therewith. A range of suitable values for the birefringence ($\Delta n$) of the RM is preferably: $\Delta n = 0.05$ to 0.35; more preferably, $\Delta n = 0.07$ to 0.3; yet more preferably $\Delta n = 0.17$ to 0.27. In essence the birefringence may be as high is as possible without compromise to light stability. Hence $\Delta n = 0.2$ to 0.27 is also a suitable range. In each of these cases the birefringence is quoted for the operating wavelength range and the values used are typical for a stable but high birefringence liquid crystal within the optical modulator.

However, the invention may be used to make optical modulators operable outside the optical wavelength range, such as in the infra-red (IR), mm-Wave or microwave spectral wavelength ranges.

The separation (d) between the first and second optical elements, for accommodating the liquid crystal, and hence the thickness of the liquid crystal material, may desirably be chosen to be at the Gooch Tarry condition given by:

$$\frac{\Delta n \cdot d}{\lambda} = \sqrt{m^2 - \frac{1}{4}}, m = 1, 2, 3 \ldots$$

where Δn is the birefringence of the liquid crystal, d is the spacing between the two opposing optical elements (e.g. taken to be the mean spacing when including the variation of the spacing due to the structured optical elements).

Typically, the spacing d may be about 5 μm at least, preferably greater. It is preferable that the cell gap d is much higher than the height/amplitude of the surface/pattern features in the birefringent optical element in question. For example: d>3 h may be a desirable criteria. Preferably: d>10 h, or d>15 h, or d>20 h, or d>25 h, to ensure that there is substantially full 90° rotation of the light polarisation direction when light is transmitted through the liquid crystal when in the twisted nematic state.

For optical quality and achromicity, it is preferably that: m>4. If lens speed is more important, or the lens is required for a narrow wavelength range, then a lower value of m may be chosen.

The liquid crystal material may be any suitable nematic liquid crystal. An example is MLC-6204-000. Alternatively, other positive Δε nematic materials may be used such as E7, MDA 1551, MLC 6437, TL 213, MLC 14200, and particularly highly birefringent nematic mixtures, such as BLO36 and BLO37. The reactive mesogen material may be any suitable RM. Examples include RMM1850 (Merck Chemicals Ltd.), or reactive mesogen RM257. Usually, the reactive mesogen will be formed from a bi-functional acrylate system to help ensure formation of a polymer with positive birefringence. It may include other photo-crosslinkable and non-crosslinkable components to adapt the properties of the birefringent polymer appropriately, including strongly cross linking compounds (eg TMPTMA), viscosity modifiers, components for improving the mean refractive index, component for increasing the birefringence, components for reducing the temperature dependence of the refractive indices, components for changing the wavelength dependence of the polymer (eg dyes, dispersive elements, fluorophores) and photoinitators and sensitizers (eg ITX). In embodiments where the birefringent surface relief structure is disposed upon a substrate, the material of substrate may be ITO. The material of the first and second electrodes may be ITO.

Alternative electrode materials include evaporated Gold, Silver or aluminium, conducting organic layers such as PEDOT, sintered conducting nanoparticles made from silver or gold, Carbon nano-tubes and graphene. The interaction between a liquid crystal and an electric field (e.g. the electric field of an electromagnetic wave) is dependent upon the magnitude of the dielectric permittivity measured parallel ($\varepsilon_{para}$) and perpendicular ($\varepsilon_{perp}$) to the director of the liquid crystal. The difference between these two values is known as the dielectric anisotropy (Δε):

$$\Delta \varepsilon = \varepsilon_{para} - \varepsilon_{perp}.$$

The optical modulator may employ a liquid crystal material that possess a dielectric anisotropy which is positive in value at the selected operating frequency, or may employ a liquid crystal material that possess a dielectric anisotropy which is negative in value.

The optical element that forms a first surface of the device may be configured to provide a different optical modulation (e.g. in respect of light of a first polarisation) as compared to optical modulation for which the second surface is configured to apply (e.g. to light of a second (orthogonal) polarisation).

The first optical element may define a lens. The second optical element may define a lens. The focal length of the first optical component (e.g. for light in the first polarisation state) may differ from the focal length of the second optical element (e.g. for light in the second polarisation state). The focal length of the first optical element may be longer than the focal length of the second optical element The focal length of the first optical element (e.g. acting on a first polarisation state of light) may be sufficiently larger/higher than the focal length of the second optical element (e.g. acting on a second polarisation states) such that the difference in focal lengths is substantially equal to the optical thickness of the liquid crystal medium between the two optical elements. In this fashion, the slight optical difference between the first and second surfaces may be compensated for, to achieve the desired (e.g. lowest possible) depth of focus.

In a second aspect, the invention may provide a method of manufacturing an optical modulator comprising one or more birefringent optical elements shaped to a desired shape for modulating an optical wavefront transmitted therethrough, wherein each birefringent optical element is provided according to a method including: providing a flexible sheet presenting an embossing surface embossed with shape which is reciprocal (e.g. the inverse or complementary shape) to the desired shape; providing a quantity of a photo-reactive material comprising a reactive mesogen in an uncured state upon a surface of a substrate; flexing the embossing surface to press against the quantity of photo-reactive material progressively across a surface of the quantity of photo-reactive material thereby to form a shaped birefringent part possessing said desired shape; curing the shaped birefringent part to form said birefringent optical element.

Flexure of the embossing surface may be caused by flexing the flexible sheet. The flexing of the flexible sheet may be caused by pressing against a localised surface area of the flexible sheet on the side thereof reverse to the side bearing/presenting the embossing surface, to cause the flexible sheet to react by flexing to form a concavity at the localised surface area and a converse convexity at the reverse side of the sheet which is the side presenting the embossing surface locally. This local convexity of the embossing surface may be pressed against the quantity of photo-reactive material on the substrate, and may present an embossing surface which is in part parallel to the surface of the substrate where urged against it, and in part inclined thereto where the local convexity causes a gradual separation of the embossing surface away from the surface of the substrate. By moving the location of the flexure of the embossing surface in a direction progressively along the surface of the substrate, the inclined part of the embossing surface sweeps across the surface of the substrate and pushes a quantity of the reactive mesogen fluid material ahead of it as it advances. Movement of the location flexure may be achieved by pressing a roller against an aforesaid localised surface area, and rolling the roller across the flexible sheet to advance progressively to new neighbouring localised surface areas.

The optical modulator may be electrically switchable. The optical modulator may comprise an electrically switchable liquid crystal material sandwiched between two such birefringent optical elements.

The method may include providing a preferential surface alignment to the embossing surface and therewith imparting the preferential surface alignment to the embossed surface of the shaped birefringent part, the surface alignment being configured to align said liquid crystal material. Means of such preferential surface alignment include, but are not restricted to, rubbing of the shaped birefringent part or applying an overcoat polymer thereto, or applying thereto a photoreactive over coating and a photoalignment of the over coating using polarised light applied thereto, or through applying an appropriate coating comprising a surfactant.

BRIEF DESCRIPTION OF DRAWINGS

In FIG. 20A the diffraction grating is in the "field off" state in which no diffraction takes place and both interfaces (Reactive-Mesogen/Liquid-Crystal) are index matched, whereas in FIG. 20B the diffraction grating is in the "field on" state in which diffraction takes place and both interfaces (Reactive-Mesogen/Liquid-Crystal) are not index matched such that different polarizations are diffracted at top/bottom interfaces;

DESCRIPTION OF EMBODIMENTS

Figure 1A:
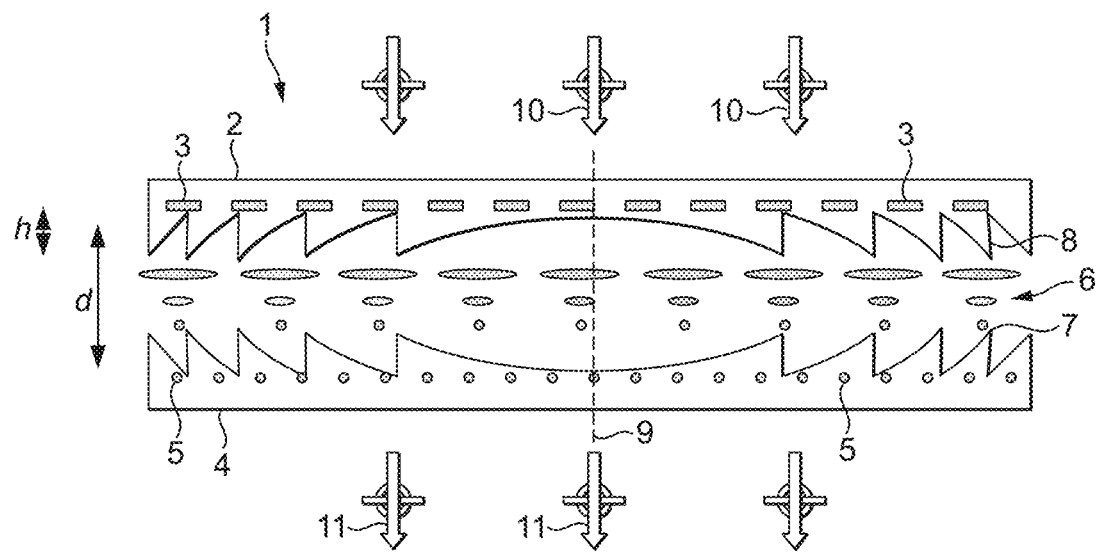
FIG. 1A and FIG. 1B schematically illustrates two states of an electrically switchable optical modulator.
Figure 1B:
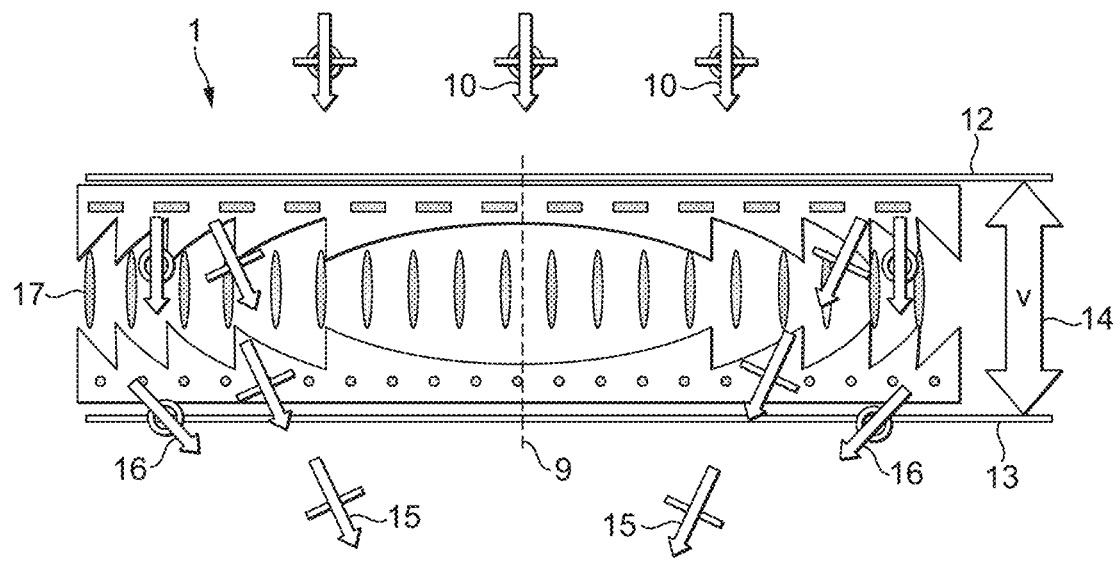

FIG. 1A and FIG. 1B schematically illustrates a cross-sectional view of an electrically switchable optical modulator 1 in each one of two switching states, which will be described in detail below.

The optical modulator, in this embodiment, is a composite Fresnel lens. The composite lens includes a pair of optically transparent and optically birefringent optical elements (2, 4) comprising a first Fresnel lens plate 2 and an opposing second Fresnel lens plate 4 spaced from the first Fresnel lens plate by a spacing (d) which is filled with a twisted nematic liquid crystal material 6. Each of the first and second Fresnel lens plates defines a respective optical axis, and the two opposing lens plates are disposed in parallel opposition with their respective optical axes 9 disposed in co-linear fashion.

The opposing surfaces of the two Fresnel lens plates each present to one another a surface relief pattern (7, 8) consisting of ring-shaped concentric annular concave sections or segments that are each functionally equivalent to an annular portion of a corresponding conventional concave lens surface. The height (h), or amplitude, of the surface relief features is substantially the same across the patterned surface of each lens plate. In other words, the depth of the concavity formed by any one of the annular concave section, is substantially the same the depth of the concavity formed by any other of those annular concave sections. The focal length of the first Fresnel lens plate is substantially equal to the focal length of the second Fresnel lens plate.

Each one of the two Fresnel lens plates is formed from a birefringent polymer and made using a birefringent polymerisable liquid crystal material known as a reactive mesogen (RM), in the form of a shaped body of resin cured into solid form. In being birefringent each Fresnel lens plate possesses an ordinary refractive index $n_o$ and an extraordinary refractive index $n_e$. The birefringent polymer material is substantially homogeneous and transparent to at least a range of wavelengths over which transmission is to occur. The velocity of light transmission through the material is determined by the direction of oscillation of vibration of the light. When a single beam of light enters a birefringent material, two beams may emerge which are displaced from each other. There exist to directions of linear polarisation of light for which there is a definite refractive index; the refractive indices associated with each of the two orthogonal directions of linear polarisation, are different.

Figure 18A:
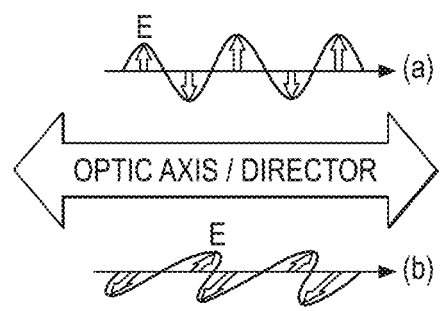
FIGS. 18A and 18B schematically illustrate ordinary and extraordinary optical beam arrangements relative to the optic axis (director) of a material comprising a liquid crystal arrangement.
Figure 18B:
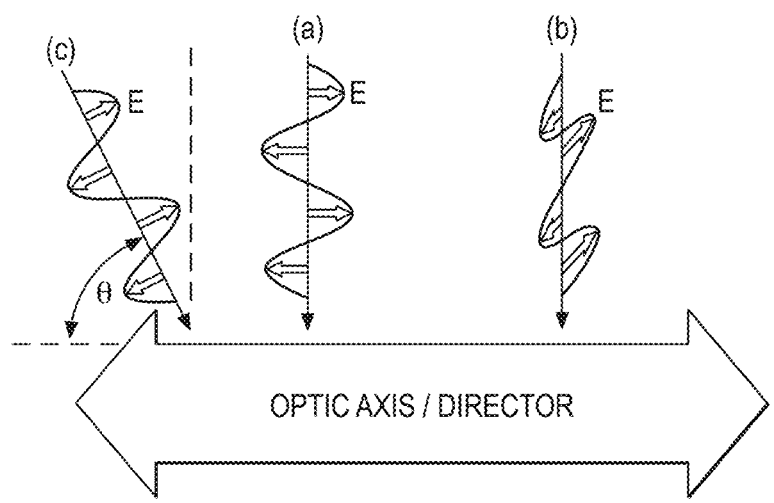

The direction of the 'optic axis' of a birefringent material relative to the direction of propagation of oscillation of the electric filed (E) of the light is what determines the refractive properties of the material. If there is propagation of light along the direction of the optic axis, then all orientations of the electric field component of the light oscillate perpendicular to the optic axis, and there is no birefringence. This is schematically illustrated in FIG. 18A in which perpendicular orientations of polarisation of light (a) and (b) are each also perpendicular to the optic axis. Here, the optic axis is defined by the 'director' of a liquid crystal material. However, if there is propagation of light transverse to the optic axis, then birefringence occurs provided that the electric filed component of the light wave oscillates in a direction along (or at least resolvable along) the optic axis if the birefringent material. Otherwise, no optical retardation occurs. This is schematically shown in FIG. 18B, in which perpendicular orientations of polarisation of light (a) and (b) are shown. The polarisation of light beam (b) is wholly perpendicular to the optic axis and experiences the ordinary refractive index of the material. However, the light ray (a) has its electric field component oriented to oscillate in-plane with the optic axis, then it experiences the extraordinary refractive index of the material. This is so even is the light ray is inclined at an angle (θ) relative to the optic axis, as shown by light ray (c).

The value of the extraordinary refractive index varies according to this ray propagation angle in the following manner:

$$n_e(\theta) = \left[\frac{\cos^2(\theta)}{n_o^2} + \frac{\sin^2(\theta)}{n_e^2}\right]^{-1/2}$$

Thus, when this light ray is inclined at an angle (θ=0), as shown in FIG. 18A, then the extraordinary and ordinary refractive indices are equal and no birefringence occurs. Conversely, when this light ray is inclined at an angle (θ=90 degrees), as shown in FIG. 18B(a), then maximum birefringence is experienced and the maximum optical retardation. occurs.

The birefringence is quantified as the difference between the values of the extraordinary and ordinary refractive indices, whereas the retardation is defined as the total phase difference experienced for orthogonal polarisations after traversing a birefringent material for a distance. That distance may be taken to be the thickness of the optical medium in question, such as a reactive mesogen or liquid crystal material, such as may be applied to and between optical elements of the optical modulator.

Mesogen materials may present solid-like and liquid-like properties. This liquid crystalline state (LC) is called the mesophase and occurs between the crystalline solid state and the isotropic liquid state at distinct temperature ranges. Liquid crystals may comprise rod-like molecules with the long axes of neighbouring molecules aligned approximately to one another. A vector, called the "director", is used to represent the direction of preferred orientation of molecules in the material of any given point. The birefringent polymer material of the first and second Fresnel plates is in the form of a cured resin in which the reactive mesogen is no longer reactive, but its director is preserved.

In the first Fresnel lens plate 2, the director 3 of the reactive mesogen material is aligned in a direction perpendicular to the optical axis 9 of the lens plate. Similarly, in the second Fresnel lens plate 4, the director 5 of the reactive mesogen material is aligned in a direction perpendicular to the optical axis 9 of the lens plate, and perpendicular to the direction of the director 3 of the material of the first lens plate 2.

The twisted nematic liquid crystal material 6, sandwiched between the first and second Fresnel lens plates, is a birefringent liquid-crystal material. The director of the liquid-crystal material is separately aligned to the director of the reactive mesogen material at each of the first and second lens plates locally, where the liquid-crystal material and the lens plates interface. In a first, quiescent, state of the liquid-crystal 6, the progressive twist of the director of this twisted nematic material ensures alignment of the liquid-crystal director to both of the two mutually orthogonal directors of the opposing first and second Fresnel lens plates. In this quiescent state, the ordinary and extraordinary refractive indices of the liquid-crystal material are both matched to the respective ordinary and extraordinary refractive indices of each of the two Fresnel lens plates. Consequently, at the boundaries between the liquid-crystal material and the opposing lens plates, no refractive index contrast exists in either the ordinary or extraordinary refractive indices of these three components of the optical modulator. As a result of this, un-polarised light (or arbitrarily polarised light, elliptically or circularly polarised light etc.) 10 is able to transmit through the optical modulator without experiencing substantially any refraction when passing from the first Fresnel lens plate to the liquid-crystal material, passing subsequently from the liquid-crystal material to the second Fresnel lens plate. This situation is schematically illustrated in FIG. 1A.

Conversely, as a schematically illustrated in FIG. 1B, in a second state, in which the optical modulator acquires a lensing function, the liquid-crystal material is acted upon by an applied electric field which changes the direction of the liquid-crystal director 17 so as to be substantially parallel to the shared optical axis of the first and second Fresnel lens plates. The optical modulator comprises a pair of transparent conductive electrodes (not shown in FIG. 1A) comprising a first electrode 12 adjacent to the first Fresnel lens plate, and a second electrode 13 adjacent to the second Fresnel lens plate. A voltage unit (not shown) is disposed in electrical connection to both of the first and second electrodes and is configured to switchably apply a predetermined voltage (V) between the two electrodes therewith to generate an electrical field 14 which is directed across the liquid-crystal material of the optical modulator in a direction substantially parallel to the shared optical axis 9 of the first and second Fresnel lens plates.

In the embodiment illustrated in FIG. 1B, the first and second Fresnel lens plates are disposed between the first and second electrodes together with the liquid-crystal material. However, in alternative embodiments (see FIG. 3C), one of the two electrodes may be disposed between the first Fresnel lens plate and the liquid-crystal material, or between the second Fresnel lens plate and the liquid-crystal material. In yet a further embodiment, (see FIG. 3D) one of the two electrodes may be disposed between the first Fresnel lens plate and the liquid-crystal material and the other of the two electrodes may be disposed between the second Fresnel lens plate and the liquid-crystal material.

As a consequence of applying the electrical field 14 to the liquid-crystal material, and the resulting change in the orientation of the liquid-crystal director, is that the extraordinary refractive index of the liquid-crystal material is rendered un-matched to the extraordinary refractive index of the first Fresnel lens plate 3 in respect of light 15 polarised in a first direction of linear polarisation. Simultaneously, the extraordinary refractive index of the liquid-crystal material is also rendered un-matched to the extraordinary refractive index of the second Fresnel lens plate 4 in respect of light 16 polarised in a second direction of linear polarisation orthogonal to the first direction of linear polarisation. Of course, the incident light 10 directed onto the optical modulator 1 is unpolarised, and therefore can be considered to consist of, or be resolvable into, equal components/proportions of light polarised in the first and second of the directions of linear polarisation. The lens in action of the optical modulator acts separately on the two orthogonal components/proportions of linearly polarised light at the two separate successive interfaces between the liquid-crystal material and the first and second Fresnel lens plates, respectively. This is shown schematically in FIG. 1B.

Figure 2:
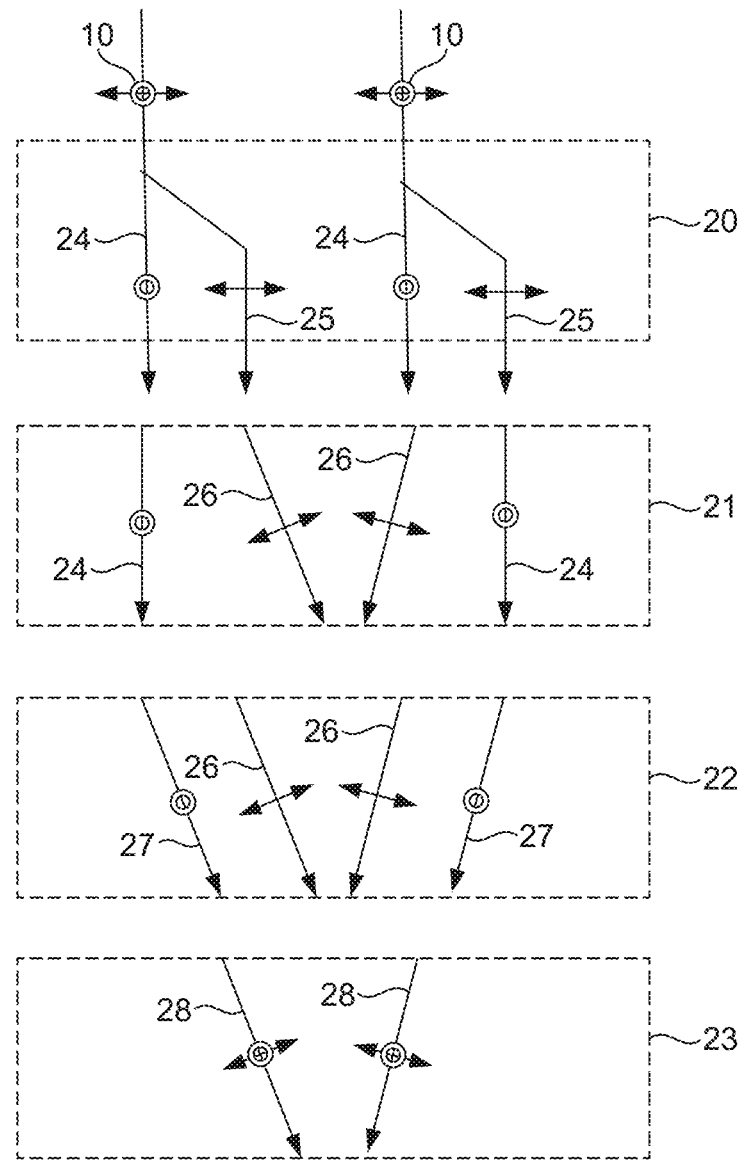
FIG. 2 schematically illustrates the function of interfaces between components of the electrically switchable optical modulator of FIG. 1B.

In order to more clearly illustrate this property of the optical modulator, and the functional steps implemented by the separate optical components of modulator, reference is now made to FIG. 2 in which four optical interfaces of the optical modulator are schematically represented, and in which their respective optical function is shown.

In particular, the optical modulator can be considered to comprise a first optical interface 20 which is the interface between the upper surface of the first Fresnel lens plate 2 at which unpolarised light or light of an arbitrary polarisation 10 enters the optical modulator.

It is important that the optical modulator according to the invention in its first aspect, and the embodiments described herein, is operable not just in respect of wholly unpolarised incident light, but is equally operable with incident light having any degree (%) of polarisation. Hence, if there is some degree of polarisation, (e.g. reflected sunlight) in incident light, or if circularly or elliptically polarised light is incident, then the optical modulator modulates the light in the same fashion.

The birefringence of the material of the first lens plate means that a first component of light 24 polarised in a first direction of linear polarisation experiences a refractive index different to the refractive index experienced by a second component of light 25 polarised in the second direction of the linear polarisation. Consequently, birefringence occurs and this is schematically illustrated in FIG. 2 by the separation of these two orthogonal polarised components (24, 25) of light. Onward propagation of these two components of light takes them to a second interface 21 within the optical modulator, which is the interface between first lens plate 2 and the liquid-crystal material in its second state 17. At this interface the extraordinary refractive index of the first lens plate is not matched to the extraordinary refractive index of the liquid-crystal material only in respect of the second component of light which thereby experiences a refractive index contrast across the interface resulting in the first lens plate implementing its intended lensing function 26. However, the ordinary refractive index of the first lens plate remains matched to the ordinary refractive index of the liquid-crystal material in respect of the first component of light which does not experience any refractive index contrast across the interface thereby preventing the first lens plate from implementing any lensing function in respect of that component light.

Onward propagation of the two components of light takes them to a third interface 22 within the optical modulator, which is the interface between second lens plate 4 and the liquid-crystal material in its second state 17. At this interface the extraordinary refractive index of the second lens plate is not matched to the extraordinary refractive index of the liquid-crystal material only in respect of the first component of light which thereby experiences a refractive index contrast across the interface resulting in the second lens plate implementing its intended lensing function 27. However, the ordinary refractive index of the second lens plate remains matched to the ordinary refractive index of the liquid-crystal material in respect of the second component of light which does not experience any refractive index contrast across the interface thereby preventing the second lens plate from implementing any lensing function in respect of that component of light.

Finally, subsequent on the propagation of the two components of light takes them both to a fourth interface 23 which is the interface between the outer edge of the second lens plate and the ambient environment beyond the optical modulator. This output light 28 comprises two combined components of mutually orthogonal linear polarisation which are each modulated (i.e. focused in this instance) separately within the optical modulator but which output as one combined, modulated optical output.

Figure 3A:
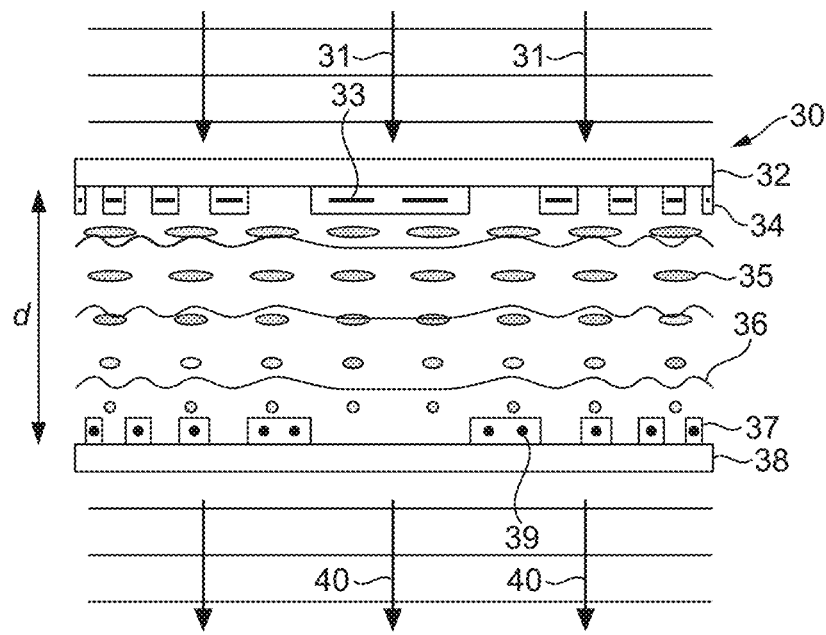
FIG. 3A and FIG. 3B show schematically a respective one of two states of an electrically switchable optical modulator, and FIG. 3C, FIG. 3D, and FIG. 3E, each respectively show schematically two states of an electrically switchable optical modulator.
Figure 3B:
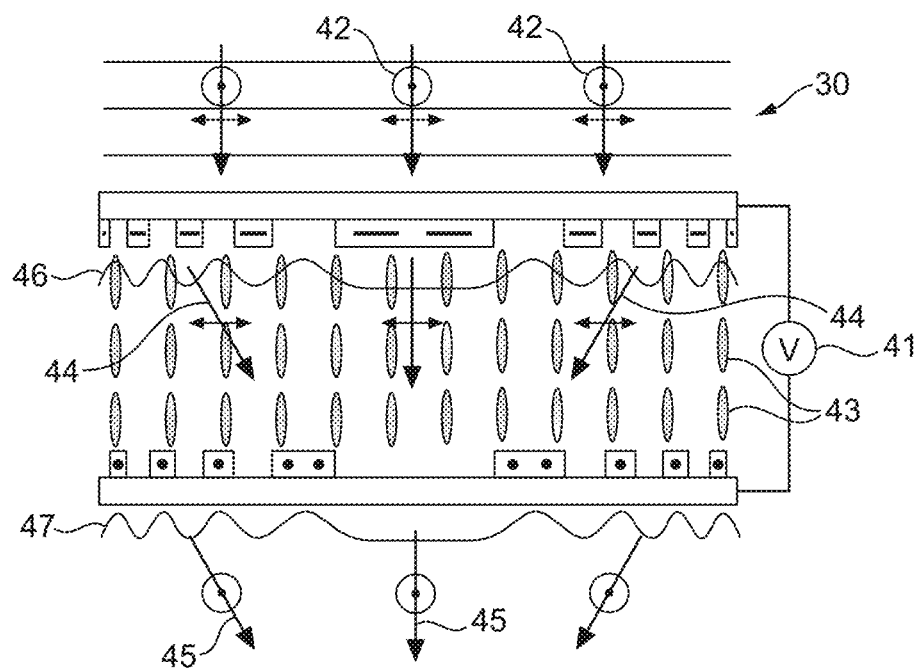
Figure 3C:
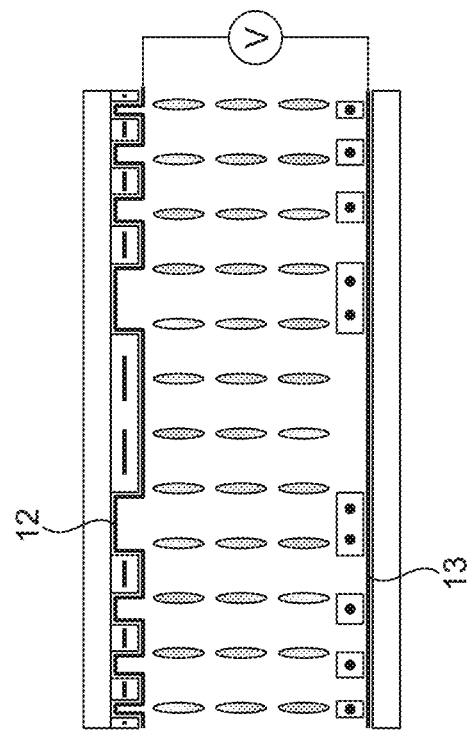
Figure 3C:
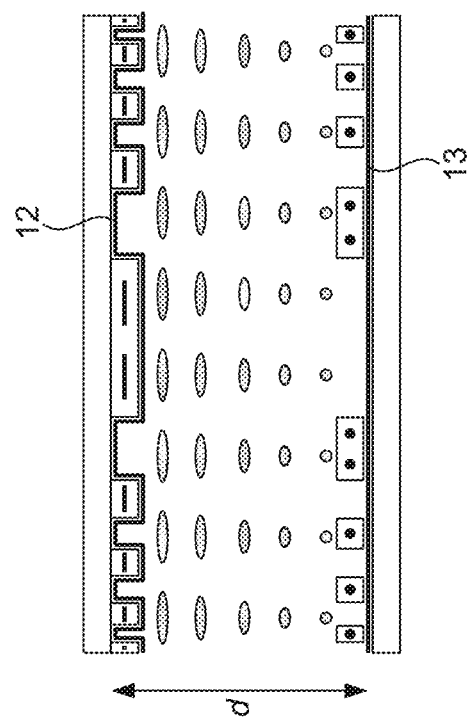
Figure 3D:
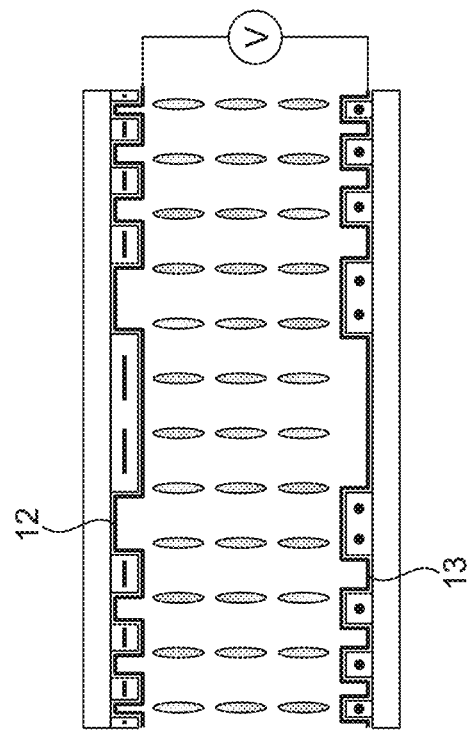
Figure 3D:
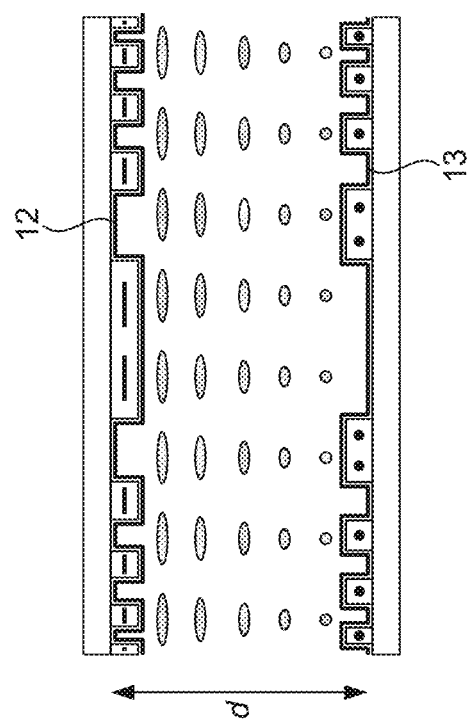

FIGS. 3A and 3B schematically show another embodiment of the invention in which the optical modulator 30 employs two opposed, optically transparent and parallel substrates spaced apart by a spacing "d". Each of the substrates bears a birefringent Fresnel zone plate pattern on a surface of the respective substrate. A first optical element is provided by a first optical substrate 32 upon which is patterned the first Fresnel zone plate pattern 34 comprising a birefringent polymer (cured reactive mesogen) material possessing a first director 33 parallel to the plane surface of the first optical substrate. A second optical element is provided by a second optical substrate 38 upon which is patterned the second Fresnel zone plate pattern 37 comprising a birefringent polymer (cured reactive mesogen) material possessing a second director 39 parallel to the plane surface of the second optical substrate, but perpendicular to the direction of the first director 33.

The first and second zone plate patterns are complementary to each other with respect to their spatial shape. That is to say where the first zone plate pattern presents a body of birefringent polymer (cured reactive mesogen) upon the first substrate, the directly opposing area of the second zone plate presents an open region of the second substrate between adjacent bodies of birefringent polymer (cured reactive mesogen) upon that substrate. In this way, the locations showing the presence of birefringent polymer (cured reactive mesogen) 34 upon the first substrate 32 are reciprocated upon an opposing part of the second substrate 38 by the absence of birefringent polymer (cured reactive mesogen) 37, and vice versa.

The reactive mesogen directors (33, 39) of the first and second optical elements define respective optical axes which are perpendicular to each other. This leads to a twist configuration of a liquid crystal material 35 sandwiched between the two optical elements. When the optical modulator 30 is in the off-state, schematically illustrated in FIG. 3A, each of the two perpendicular polarisation components of unpolarised light 31 propagating through the structure undergo a respective polarisation-rotation of 90° but passes without distortion of the respective wavefront 40 (phase front).

When the optical modulator 30 is in the on-state, schematically illustrated in FIG. 3B by application of a voltage 41 between electrodes (not shown) disposed upon the first and second optical elements, the liquid crystal 43 re-orients along the electric field generated by this voltage in a direction perpendicular to the plane of each of the first and second substrates.

This reorientation prevents the respective polarisation-rotation of 90°, which is otherwise provided in the off-state, and both of the two perpendicular components of polarisation (44, 45) present within the incident light 42, undergo a distortion of their respective wave fronts (phase fronts 46 and 47) at a respective one of the first and second optical elements. This leads to lensing from the first optical element in respect of one of the two components of polarisation 44, and separate lensing from the second optical element in respect of the other of the two components of polarisation 45.

The complementary design of Fresnel zone plate pattern in (34, 37) upon the first and second optical elements achieves a more uniform electric field distribution throughout the cell, as compared to alternative designs in which the Fresnel zone plate patterns are not complementary. Consequently a voltage-independent lensing may be achieved once the critical voltage has been exceeded, whereby the lensing effect remained stable against changes in the applied voltage (V). This arrangement is less sensitive to imperfect refractive index matching as between the refractive indices of the liquid crystal material and the birefringent Fresnel zone plates, because distortions imposed upon the initially undistorted incident wavefront 31, by such imperfections if present, (resulting in slightly distorted phase front 36) by the first optical element (32, 43) are substantially compensated by the complimentary distortions imposed upon the slightly distorted wavefront 36 to produce a substantially undistorted output wavefront 40 when passing through the second optical element (37, 38) as shown in FIG. 3A. This makes this design resilient against imperfections in refractive index matching which may occur due to refractive index changes within the device.

Figure 3E:
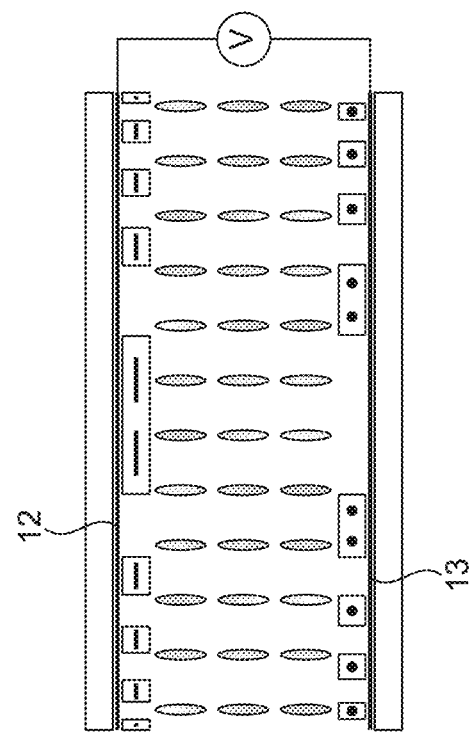
Figure 3E:
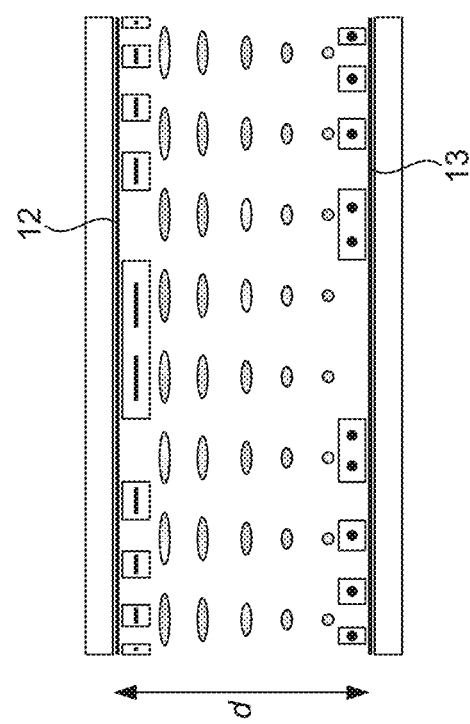

In the embodiment illustrated in FIGS. 3A and 3B, the first and second Fresnel zone plates are disposed between the first and second electrodes (12, 13: e.g. see FIG. 1B) together with the liquid-crystal material. However, in alternative embodiments (see FIG. 3C), one of the two electrodes 12 is disposed between the first Fresnel zone plate and the liquid-crystal material, or between the second Fresnel zone plate and the liquid-crystal material. In yet a further embodiment, (see FIG. 3D) one of the two electrodes 12 is disposed between the first Fresnel zone plate and the liquid-crystal material and the other of the two electrodes 13 is disposed between the second Fresnel zone plate and the liquid-crystal material. In yet another embodiment, (see FIG. 3C and FIG. 3E) one (12, FIG. 3C) or each (12, 13; FIG. 3E) of the two electrodes (12, 13) is disposed, in their respective Fresnel zone plates, between the RM surface relief pattern (Fresnel zone pattern) and the transparent planar plate/substrate upon which the RM surface relief pattern is formed. With such arrangements it is preferable to minimise the optical effects of the conducting electrode. However, the use of these arrangements removes the loss of field that occurs across the electrically inactive reactive mesogen optical element, and therefore reduces the operating voltages and electrical power.

Figure 19A:
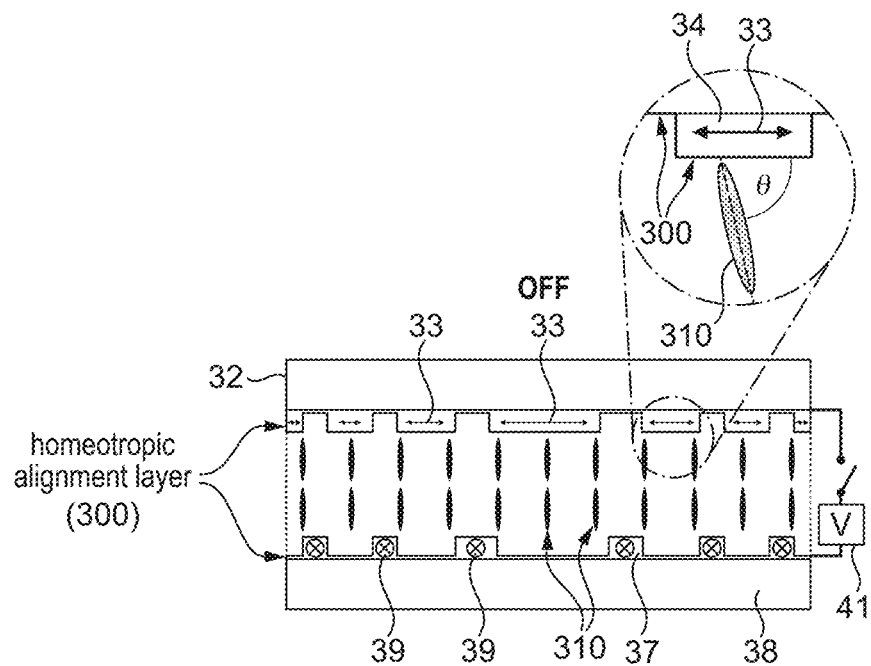
FIG. 19A and FIG. 19B show schematically a respective one of two states of an electrically switchable optical modulator.
Figure 19B:
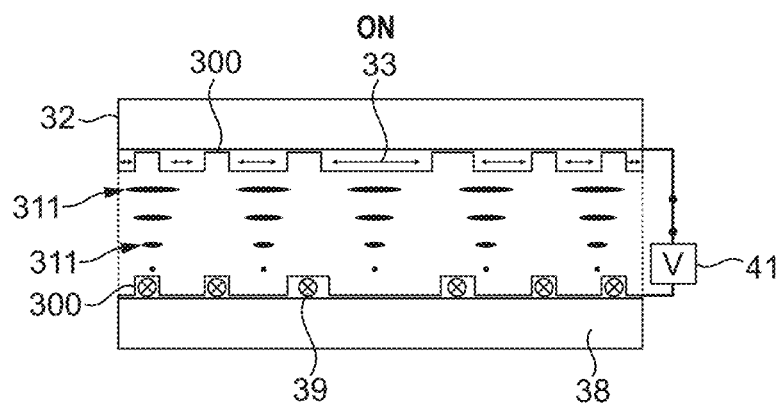

FIGS. 19A and 19B show an alternative embodiment according to the invention. In this alternative, the application of an electric field to the liquid crystal sandwiched between the first and second optical elements may cause the optical modulator to cease its modulating function, whereas removal of that electric field allows the modulator to resume modulation. This is the converse of the arrangement described above with reference to FIGS. 3A and 3B. In this alternative arrangement, a vertically aligned twisted nematic liquid crystal 310 is employed between the first and second optical elements (32, 38).

FIG. 19A shows a homeotropic state of the liquid crystal 310 when the optical modulator is in the "electric field OFF" state. In this state no voltage (V) is applied across the electrodes of the system (12, 13) by the voltage unit 41, a pre-tilt (inset: FIG. 19A) is present in the liquid crystal. The pre-tilt is in the direction of the optic axis 33 of the birefringent polymer forming the adjacent Fresnel zone plate 34.

The arrangement of the optical modulator in this embodiment is based on the embossed anisotropic Fresnel zone plates (34, 37) described above with reference to FIGS. 3A to 3E. However, in addition, in this embodiment the Fresnel zone plates are each over-coated with a homeotropically aligning material 300 (e.g. polyimide, silanes, lecithin, photoalignment material).

The liquid crystal has a pre-tilt 310 in the direction of the optic axis of the underlying Fresnel zone plate which may be induced by rubbing or photoalignment. The modulator comprises a first and second optical elements (32, 33; 37, 38) and each one of those has an optic axis (i.e. of the director of the birefringent material of the Fresnel lenses: 33, 39) being perpendicular to that of the other.

The liquid crystal, assumes a homeotropic configuration 310 in the "field-OFF" state [FIG. 19(A)], and this state allows polarisation-independent lensing by the optical modulator, as described above with reference to FIG. 3A.

FIG. 19B shows the "electric field ON" state in which a voltage (V) is applied across the electrodes of the system (12, 13) by the voltage unit 41. Here, an electric field-induced twisted nematic configuration 311 is provided in the liquid crystal. The liquid crystal may possess a negative dielectric anisotropy. In the "field-ON" state, the liquid crystal 311 orients perpendicular to the electric field due to the negative dielectric anisotropy. Here, the liquid crystal 311 is index matched to the ordinary and extraordinary refractive indices of the birefringent material forming the Fresnel zone plates e.g. formed from a cured reactive mesogen, as described above with reference to FIG. 3A. Substantially no lensing occurs in this state. The pre-tilt of the liquid crystal 310 in the direction of the optical axes (directors: 33, 39) of the underlying birefringent Fresnel lenses leads to a twisted nematic configuration [FIG. 19(B)]. Under this condition, the optical modulator does not focus the light because the anisotropic Fresnel zone plates are index matched to the liquid crystal.

In an alternative embodiment, only one of the two optical elements (32 or 38) exhibits/provides a pre-tilt 310 while the other is perpendicular to the substrate. The twist under applied voltage can be induced by using a chiral nematic with d/p=0.25, where d is the cell gap and p is the pitch of the chiral nematic.

A calamitic reactive mesogen (RM) may be used to form the birefringent optical element/polymer and a calamitic nematic liquid crystal may be used as the liquid crystal material sandwiched between them, in optical contact therewith. The nematic liquid crystal may be arranged to be approximately planar, such as in FIGS. 3A and 3B, and may be arranged to be uniformly aligned to prevent scattering.

The RM preferably has a high birefringence. A range of suitable values for the birefringence (Δn) of the RM is preferably: Δn=0.05 to 0.35; more preferably, Δn=0.07 to 0.3; yet more preferably Δn=0.17 to 0.27, where the values are given for the visible wavelength range. Of course, the device may be designed to operate in other wavelength ranges, including IR, mm Wave, Microwave and THz. In essence the birefringence may be as high is as possible without compromise to light stability. Hence Δn=0.2 to 0.27 is also a suitable range.

The RM may be, in effect, bi-functional. For example, this may be the case when calamitic (rod-like) polymerisable groups (e.g. acrylate groups) are attached at either end of the RM. This ensures that the RM induces planar alignment in the liquid crystal. The desired alignment of the RM material is most preferably maintained throughout the optical element formed from the RM. This may be hybrid aligned or twisted alignment, but in most instances a planar homogenous alignment of the RM director throughout the optical element is preferred, in some implementations. Nevertheless, the twisted nematic configuration of liquid crystal within the optical modulator may lead to some beneficial properties. In particular improved wavelength dependence and less dispersion may be achieved. The examples of the optical modulator provided herein have used a generally planar configuration/structure because this structure is simple to manufacture and to design. However, the invention is not limited to such generally planar structures or designs.

The optical element may be structured (e.g. shaped or patterned) to provide a refractive optical effect and/or diffractive optical effect upon a transmitted optical wavefront, through differences in refractive index between the contacting liquid crystal and the RM optical elements, which are shaped to give the desired effect. For example, the optical elements may be shaped in the form of a refractive lens (e.g. a simple lens, or Fresnel lens), or in the form of a refractive prism, or to form a diffractive structure such as a diffraction grating or Fresnel diffractive optical element. The liquid crystal material is selected to be compliant in order that the bulk liquid is able to adopt a shape compliant with (i.e. form the inverse shape/structure) the shape or structure of the optical element with which it is interfacing with. This provides a refractive or diffractive interface/surface for modulating an optical wavefront.

Preferably, each optical element is deposited onto an alignment layer being less than about 100 nm thick, which is in turn preferably deposited onto a transparent electrode. The optical element is preferably designed and fabricated so that a maximum electric field may be applied to the liquid crystal material between two opposing electrodes. That is to say, the minimum distance between the alignment layer and the surface of the optical element adjacent to the liquid crystal material, is preferably as low as possible. For example, an optical structure formed by the RM material of an optical element, preferably displays pattern amplitudes (e.g. troughs in a grating structure or Fresnel lens/plate) that are as close as possible to the alignment and electrode layers. This minimises the value of the minimum distance between the electrode and the adjacent active liquid crystal layer and ensures that switching voltages are kept as low as possible.

The liquid crystal material and the optical element (diffractive or refractive) may preferably be formed from a calamitic liquid crystal and a birefringent polymer (cured reactive mesogen), respectively, although discotic liquid crystal material may be used for the former. If positive birefringent calamitic types are used for both the birefringent optical elements and the liquid crystal between them, then components of light polarised parallel to the optic axis (director) of the birefringent optical element is refracted/diffracted whereas components of light polarised perpendicular to the optic axis (director) of the birefringent optical element is transmitted without significant refraction or diffraction, such as is described above.

The two optical elements of the optical modulator are desirably separated by a contacting liquid crystal medium that is substantially transmissive in an operating wavelength range of the optical modulator. The liquid crystal between the two optical elements of the optical modulator is preferably arranged to be at least locally index matched close to the interfacing surfaces of the two optical elements. This means that the director profile of the liquid crystal desirably is arranged to twist through 90° to form a twisted nematic.

The spacing of optical elements and hence the thickness of the twisted nematic liquid crystal material may desirably be chosen to be at the Gooch Tarry condition given by:

$$\frac{\Delta n \cdot d}{\lambda} = \sqrt{m^2 - \frac{1}{4}}, m = 1, 2, 3 \ldots$$

where Δn is the birefringence of the liquid crystal, d is the spacing between the two opposing optical elements (e.g. taken to be the mean spacing when including the variation of the spacing due to the structured optical elements).

For optical quality and achromicity, it is preferably that: m>4. If speed is more important, or the lens is required for a narrow wavelength range, then a lower value of m may be chosen. Typically, the spacing d may be about 5 μm at least, preferably greater.

It is important that the cell gap d is much higher than the height/amplitude of the surface/pattern features in the birefringent optical element in question. For example: d>3 h may be a desirable criteria to be made, since the director profile desirable becomes substantially uniform for the direction of polarisation of polarised components of light to be rotated through 90°. Preferably: d>>3 h, such as d>10 h, or d>15 h, or d>20 h, or d>25 h, to ensure that there is substantially full 90° rotation of the light polarisation direction when light is transmitted through the liquid crystal when in the twisted nematic state. At a distance of approximately 1 h from the top/outer parts of the surface pattern features of an optical element, this condition desirably will be approached, thus the condition 3 h arises when one takes account of two such opposing surfaces and a uniform central area where the twisted nematic liquid crystal is substantially uniform. This central uniformly twisted region preferably has a thickness greater than h.

Manufacturing an Embossed and Aligned Birefringent Polymer

The invention may provide a method of manufacture of optical elements for an optical modulator. For example, a method is provided for manufacturing the electrically switchable optical modulator described above, comprising an electrically switchable liquid crystal material sandwiched between two birefringent optical elements shaped to a desired shape for modulating an optical wavefront transmitted therethrough. Any one or each of the birefringent optical elements of the modulators may be provided according to a method including: providing a flexible sheet presenting an embossing surface embossed with shape which is reciprocal to said desired shape; providing a quantity of a reactive mesogen material in an uncured state upon a surface of a substrate; pressing the embossing surface against the quantity of reactive mesogen material progressively across a surface of the quantity of reactive mesogen material thereby to form a shaped birefringent part possessing said desired shape; curing the shaped birefringent part to form said birefringent optical element. The method may include providing a preferential surface alignment to the embossing surface and therewith imparting the preferential surface alignment to the embossed surface of the shaped birefringent part, the surface alignment being configured to align said liquid crystal material.

The RM may be formed into a desired shape (e.g. lens shape or other pattern) whilst in a liquid form, between a substrate comprising a transparent electrode and an embossing alignment layer that contacts the RM whilst liquid so as to emboss the desired shape into it and to impose a desired alignment into the surface of the RM simultaneously. The following the procedure may be employed:

In a first step: define an original master of/for the birefringent optical element e.g. using diamond cutting or lithographic methods (photolithographic, electron-beam, etc.). Procedures such as those readily available to the skilled person in the art may be employed for this step, such as are applied for producing optical gratings, lenses or prismatic elements.

This original master may be subsequently copied into a metal shim (e.g. Nickel) using, for example, electro-forming. Alternatively, the original may be used to make the copies.

In a second step: the reciprocal shape of the desired pattern or shape is embossed into a resin material (e.g. using either hot foil or photo embossing) disposed upon a flexible backing substrate, such as PET film. This forms an embossing surface for use in embossing an RM material.

In a third step: a preferential alignment is imparted to the upper surface of the embossing surface. This may be induced by a rubbing of the resin (polymer) upper surface, or by coating the embossed resin structure with an alignment layer (preferably thin), such as a liquid crystal polymer, surfactant or photo-alignment agent and imparting the correct direction to the surface of the inverse optical element.

In a fourth step: providing an optical substrate onto which the optical element (RM material) is to be deposited (for example a glass or transparent non-birefringent plastic), having an electrode structure and appropriately aligned planar alignment layer (usually a rubbed polyimide or photo-alignment layer) deposited onto it. A quantity of uncured/liquid RM material is then deposited on to one surface of that substrate, in a line or strip, and the flexible embossing surface is placed in contact with the liquid RM material. A roller is applied to a reverse surface of the flexible backing substrate to flex the substrate and the embossing surface upon it while simultaneously pushing the embossing surface into the liquid RM material. At a suitable pressure and speed, with the RM material in contact with the embossing surface, the roller is pushed along the reverse surface of the flexible backing substrate to flex the embossing into the liquid RM material progressively along across the surface of the optical substrate to spread the RM material across it whilst simultaneously embossing it. That is, the embossing is done such that the RM is pressed into the shape of the original optical master structure and with minimum offset between the base of the features in this element and the electrodes.

The resin on the film is usually arranged so that the alignment direction of its surface coating is equivalent (parallel or antiparallel) to the alignment direction of the surface. The effect of the alignment layers either side of the RM cause it to form a uniform birefringent state with the (or close to the) full birefringence that is possible for the RM. The RM is then cured to form a polymer, and when the film and resin mould are removed, the aligned polymer RM is left on the glass substrate.

The embossing process may be done at an elevated temperature to obtain the optimum viscosity for a practical embossing speed and pressure. The process may be done at temperatures where the RM is an isotropic liquid. In this instance, cooling of the RM in contact with the film may be done in a controlled manner. It is preferable that thermal gradients on cooling are in the direction of the optic axis of the RM.

The curing should be done at a cool temperature but in the nematic phase of the uncured RM, such that the order parameter, and hence birefringence are maximum.

Preferably the curing will be done at the lowest temperature possible in the nematic phase of the RM, to maximise the order parameter and hence birefringence of the layer. In such instances the liquid crystal is substantially matched to the RM across the operating temperature range of the device, rather than at the temperature of curing the RM. The aligned RM will usually impart sufficiently strong alignment to the contacting nematic liquid crystal. This alignment is spontaneously in the required direction for correct operation. However, device operation may be improved by enhancing this alignment by additional rubbing, photoalignment or surfactant layers.

Agents may be added to the RM to improve the adhesion between the glass and the cured RM. Alternatively, different agents may be added that selectively reduce adhesion between the cured resin and the resin. In either instance, the concentration of the additive should be sufficiently small to ensure that the properties of the resin are not affected. Preferably, these additives will be surface specific to increase efficacy.

Similarly, UVO3 or plasma treatment of the resin may be used to help reduce adhesion between the cured RM and the resin. The RM structure may be patterned by printing appropriate areas of adhesion promoter for the RM, so that the RM selectively adheres to the glass substrate in areas on which the promoter is deposited but removed from the glass where the adhesion to the resin of the film is stronger.

The optical element may be a refractive lens of either the simple or Fresnel forms, or it may be a diffractive lens that uses Fresnel zones. Alternatively, it may form other refractive structures such as a prism or a diffractive structure such as gratings or holographic element.

An alternative design would have the conductive electrode deposited on top of the optical element. This design may be chosen where a lower switching voltage needs to be minimised. For example, in large refractive lenses, even of the Fresnel type, the height of the structure will cause a high voltage drop across the dielectric material. This is minimised if the electrode (or a second electrode connected to the underlying electrode) is deposited onto the top surface of the RM optical structure. The electrode may be formed from a sputtered layer such as ITO, or by a thin coating of conducting (e.g. Ag) nano-particles that are subsequently annealed at high temperature to form a uniform conducting coating, or by using a thin layer of conductive polymer such as PEDOT. In each case, an additional planar homogenous alignment layer on top of the conductor is required. The direction of the preferred alignment should be parallel to the direction of the aligned RM.

Figure 4:
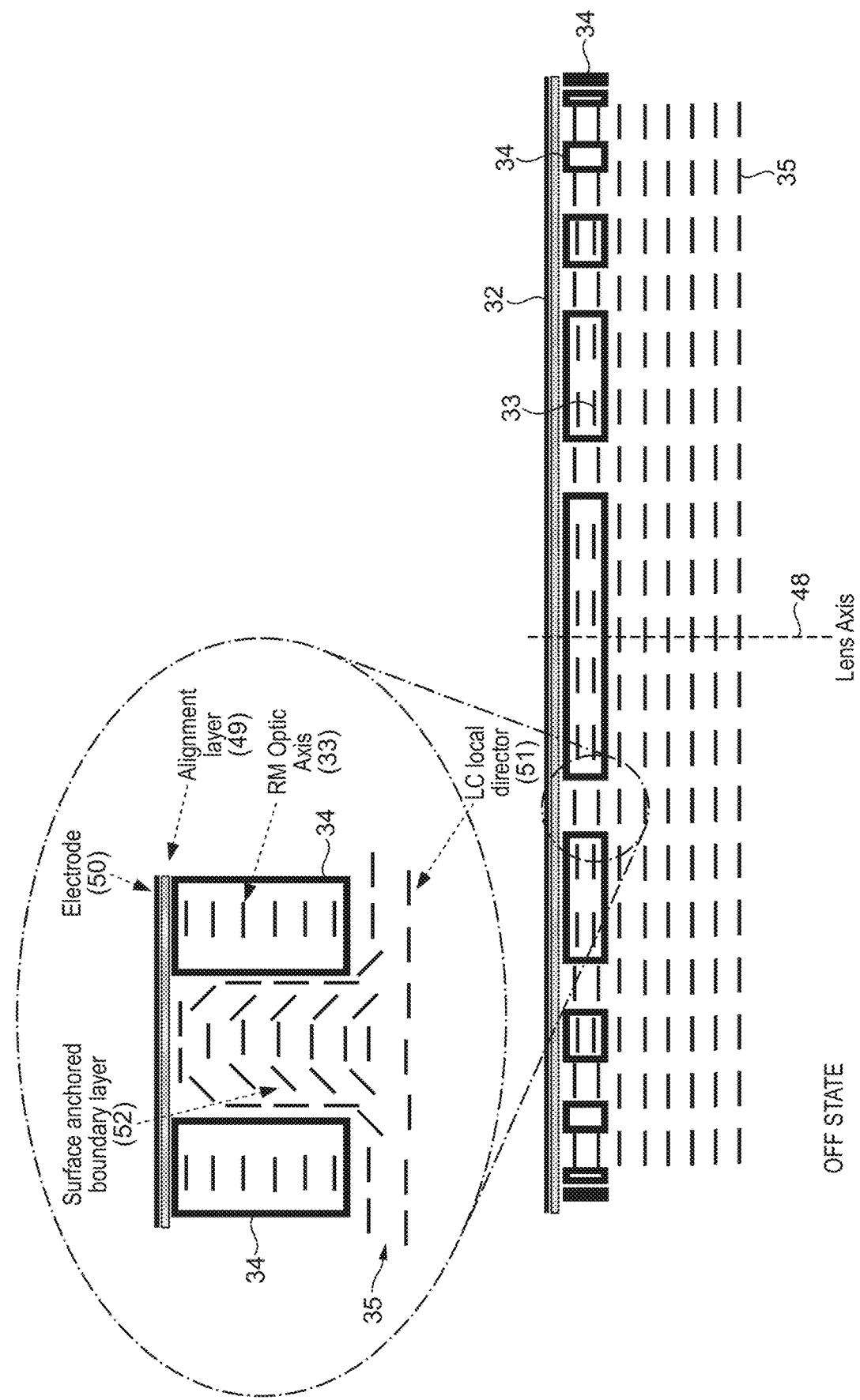
FIG. 4 schematically illustrates an exploded view of a part of the electrically switchable optical modulator of FIG. 3A.

FIG. 4 schematically illustrates a part of the optical modulator of FIG. 3A, comprising an upper optical element including a transparent substrate 32 bearing an RM surface pattern 34, the RM possessing a director 33.

Liquid-crystal material 35 is shown only in the region adjacent to the upper optical element. In the 'OFF' state the director 51 of the liquid-crystal material is, on average, oriented in a direction perpendicular to the lens optical axis 48, this being an axis of cylindrical symmetry of the Fresnel lens, which is perpendicular to the plane of the transparent substrate 32.

An exploded view of a portion of the liquid-crystal material 35, immediately adjacent to a portion of the RM surface pattern forming the Fresnel zone plate of the upper optical element, is shown in FIG. 4. This illustrates that while the local liquid-crystal director 51 is mostly oriented perpendicular to the lens axis 48, and simultaneously substantially parallel to the RM optic axis (director) 33 within the material of the Fresnel zone plate 34, the immediate interface between the liquid-crystal material 35 and the vertical surfaces of the RM pattern, form a surface anchored boundary layer 52 in which the local liquid-crystal director 51 is substantially parallel to the lens axis 48 and substantially perpendicular to the RM optic axis (director) 33. The exploded view also shows the position of the electrode 50 upon the upper surface of the transparent substrate 32 and the provision, upon the lower surface of the substrate, of an alignment layer 49 in contact with both the liquid-crystal material 35 and the RM material 34 within the optical modulator.

Figure 5:
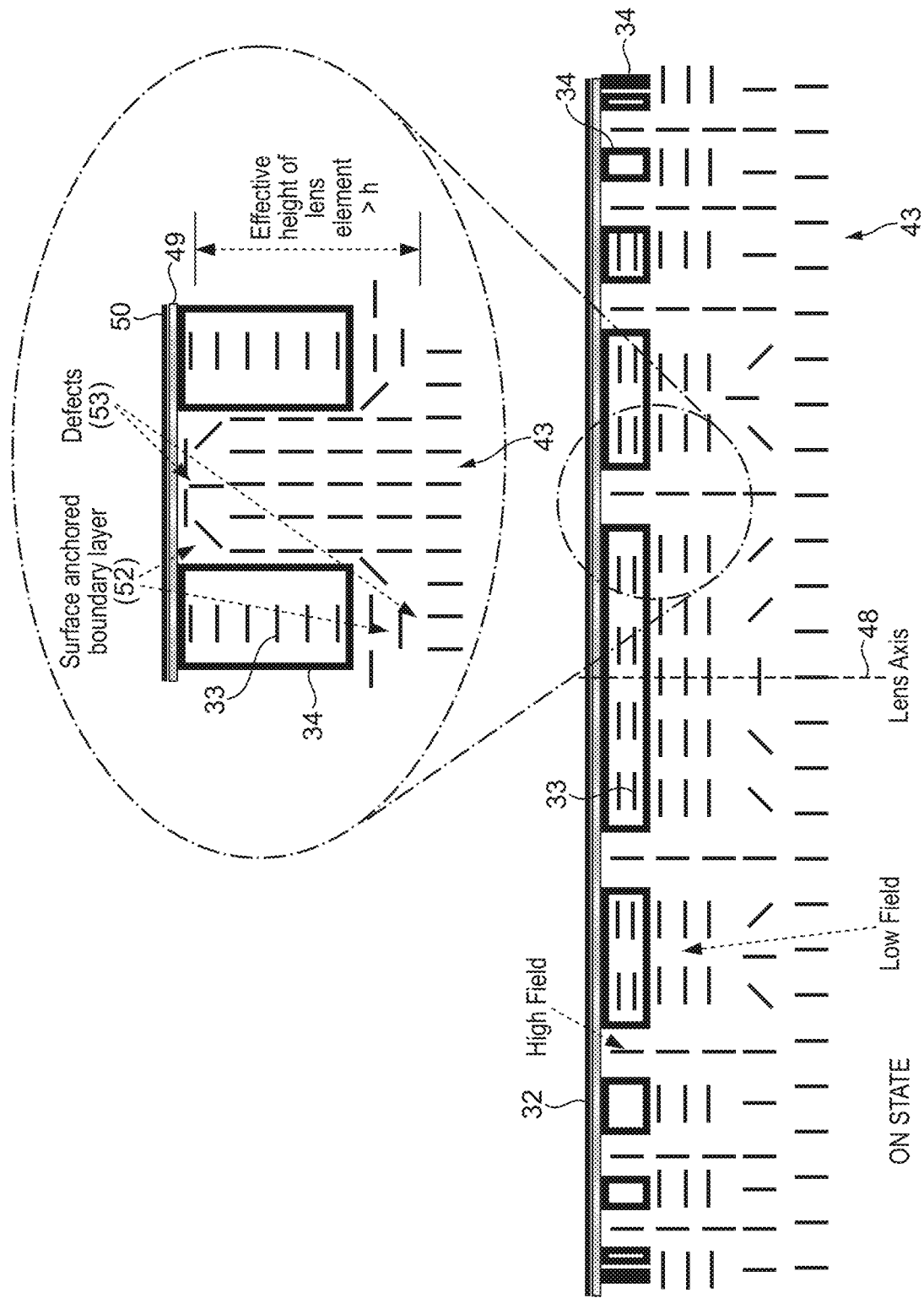
FIG. 5 schematically illustrates an exploded view of a part of the electrically switchable optical modulator of FIG. 3B.

FIG. 5, illustrates the view illustrated in FIG. 4 in which the optical modulator is switched to the 'ON' state. Here, the electric field produced between the opposing electrodes of the optical modulator is relatively higher in those regions within the modulator where no RM material is present, and were liquid-crystal material 43 resides (shown in the field-aligned state). However, regions of the liquid-crystal material immediately adjacent to regions of RM material, within the optical modulator, experience a lower electric field strength due to the shielding effect of the dielectric RM substance, and also due to the surface anchored boundary layer 52 formed at the RM surface. This results in the director of the liquid-crystal material, immediately adjacent to the RM material, to adopt an orientation which is perpendicular to the lens axis 48. This has the net effect of increasing the effective height of the Fresnel zone plate elements 34 to be slightly higher than their actual height.

At low voltages, the director in the ON state will not be vertical close to the surfaces, requiring a field that is substantially higher than the Fréedericksz transition. The Fréedericksz transition is a phase transition in liquid crystals produced when a sufficiently strong electric or magnetic field is applied to a liquid crystal in an undistorted state. Below a certain field threshold the director remains undistorted. As the field value is gradually increased from this threshold, the director begins to splay until it is aligned with the field.

This results in the first internal surface (i.e. on the incident side) giving imperfect refractive effect at lower fields where the director is not vertical at the surface (see FIG. 5 for the ON state).

The material used for the lenses may be chosen so that the ordinary index of the refractive index of the RM is slightly higher than that of the LC, to help optimise increase the contrast between the on and off states. If the electrode is beneath the lens, for example if a diffractive Fresnel lens is used, then the depth of the lens structure may be reduced compared to that of the master to obtain the same efficiency since the dielectric effect of the lens will reduce the field close to the surface (as shown for the ON State in FIG. 5) in those areas, and hence amplify the equivalent depth of the structure. That is, the effective height of the diffracting structures will be increased above h for the switched state, more than for the OFF state, as shown in FIG. 4.

If perfectly vertical, there will be an error for one polarisation being refracted or diffracted by the first surface, due to the angular dependence of the beam. It is preferable to arrange the dielectric constants of the material to favour refraction of the applied field to be of a similar nature to that of the optical effect. If electrodes are deposited onto the grating or lens element, then the optical and electrical refraction effects should be similar automatically.

The invention enables a new approach to polarisation-independent adaptive optics which can be applied to a vast range of passive optical elements to make then electrically switchable. A method of embossing the desired shape into an optically anisotropic liquid crystalline material is provided. Polarisation-independence may be achieved by combining two of those substrates, e.g. with orthogonal optical axes, into a cell. The cell may be filled with a nematic liquid crystal in a twisted nematic configuration. The refractive indices of the liquid crystal may be index-matched to the substrates.

A further example of a first application, on Fresnel zone lenses, is now described that can be switched from a non-focusing state in absence of electric field to a focusing state in the field-on-state. This may be extended to multi-level Fresnel lenses to overcome the 41% efficiency limit of the binary structure. We further show examples for polarisation-independent optical gratings and micro-lens arrays to prove that this technique is applicable to a wide range of optical elements.

A Fresnel zone plate (FZP) relies on diffraction effects to focus light at a focal point M. Light transmitted from a collimated source and transmitted through the FZP can be characterised by either constructive or destructive interference at point M depending on the path length from the point in the FZP plane to the focal point. Focussing at M is achieved by phase shifting light of destructively interfering regions by 7 with respect to the other regions. This leads to the partitioning of the plate in the name-giving zones.

From simple geometric arguments and the interference condition, the zone radii $r_m$ are given by:

$$r_m = \left[n\lambda\left(f + \frac{m}{4}\lambda\right)\right]^{1/2}$$

where m is the number of the ring, f the nominal focal length and λ the wavelength of light in question.

In the following example, an embossing technique is used to imprint a Fresnel zone plate in reactive mesogens. Embossing is the method of choice here as it enables replication of structures substantially without having an offset. The zero offset condition is highly desirable in electro-optical devices to avoid unnecessary voltage drops and large electrical variations over a device. Other imprint technologies may be prone to some offset regardless of how high the pressure is, because the liquid photopolymer is prevented from flowing around rigid structured elements. With embossing, in the present examples, the structured element is formed on a flexible film that allows the liquid photopolymer to be pushed from one side of a substrate to the other, filling in the gaps formed between the electrode and the film.

Figure 6A:
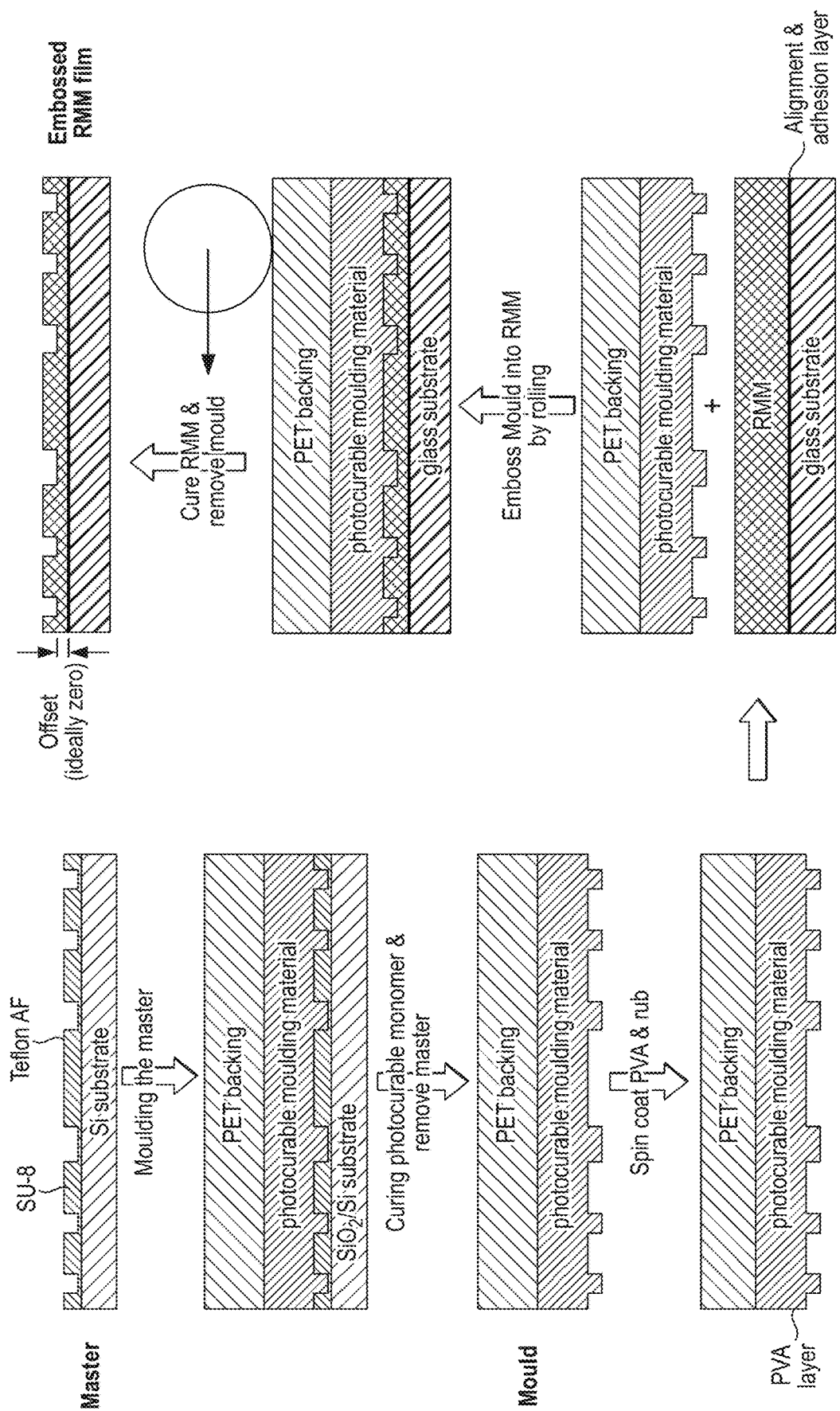
FIGS. 6A and 6B schematically illustrate a process for manufacturing an optical element employable in an optical modulator of FIG. 1A, 1B, 3A or 3B.
Figure 6B:
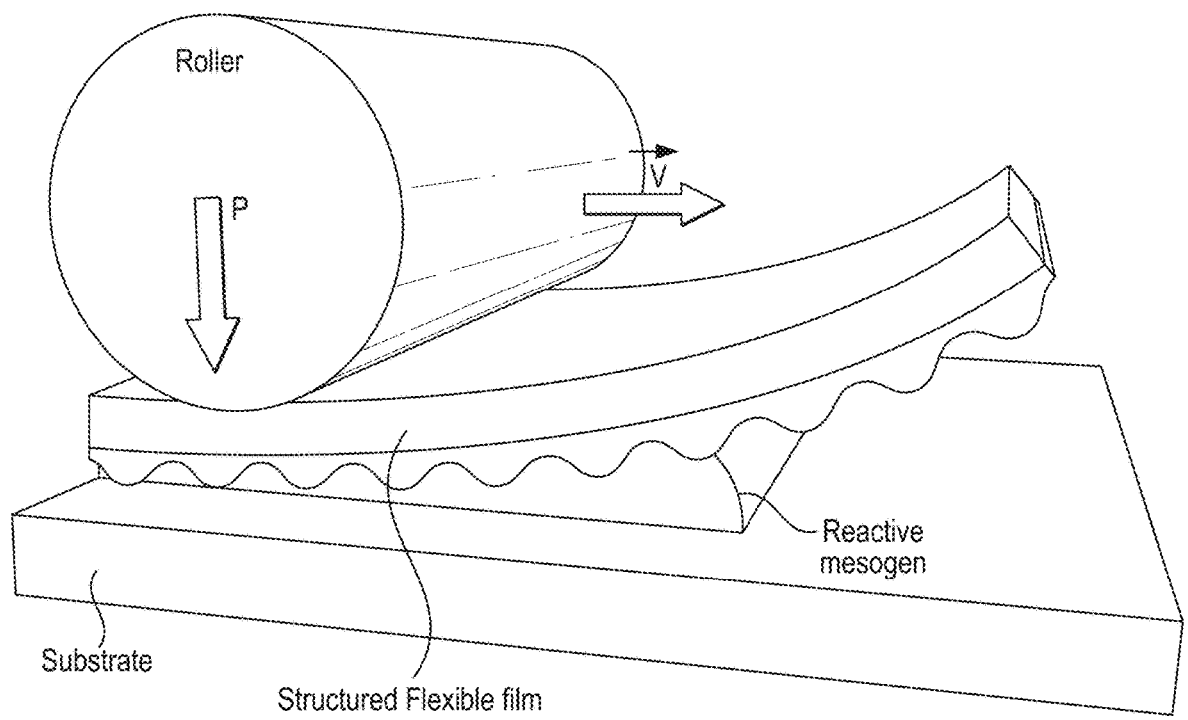
Figure 7:
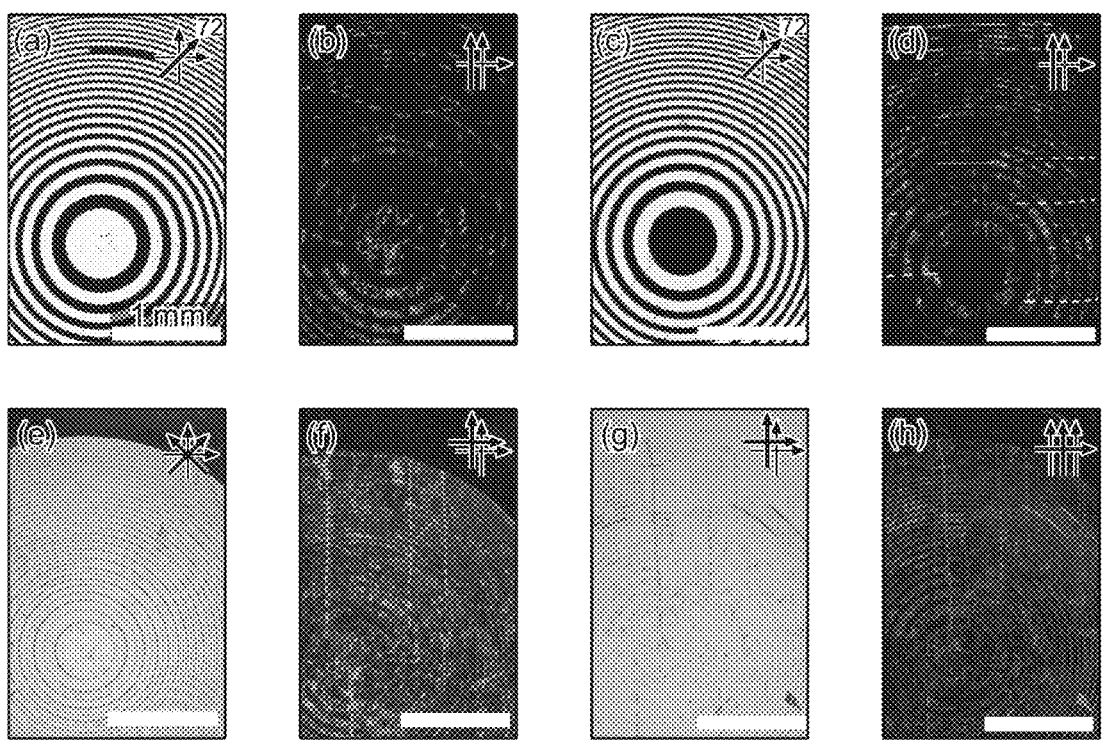
FIGS. 7($a$) to 7($h$) present views of optical elements embossed with material comprising birefringent polymer formed using a reactive mesogen.

Schematic representation of the embossing process is shown in FIGS. 6A and 6B. A flexible structured film 60 carrying an inverse 61 of the desired structure is pressed by a roller 62 with a pressure p onto a substrate 63 to spread a quantity of liquid reactive mesogen 64 progressively across the substrate surface. In particular, with reference to FIG. 6A, a rubber coated roller 62 presses a pre-structured flexible film 60 on the surface of substrate. The substrate 63 may be rigid like glass, ITO or silicon, or it may be flexible such as PET (polyethylene terephthalate). Between the substrate and structured film, the reactive mesogen is spread by pushing down the roller with a certain pressure and velocity. These quantities may be adjusted appropriately to within a range that leads to zero offset. The temperature of the system may be altered to control the viscosity of the fixable material to allow the pressure and speed required of the process to be within a desirable range. For example, pressures of about 4 to 7 bar may be used for an RM material. The viscosity of the RM material at room temperature may be about 500-800 cP. The roller and baseplate may be heated to 50° C. to 70° C. to achieve a 100-200 cP viscosity. The embossing velocity may be about 0.1 to 2 cm/min. After the embossing step, the reactive mesogen is UV cured (i.e. irradiated with ultra-violet light) and the structured film is removed, leaving behind the desired polymerised structure. The temperature at which the curing is done may differ from that of the embossing, or indeed ambient temperature. The inventors have found that a higher birefringent optical structure could be formed from the RM by cooling the film below ambient (but above the freezing and glass transition temperatures) during the curing process. Values of viscosity stated herein may be measured according to the International Organization for Standardization (ISO) standard "ISO 3219:1993".

The process of producing the birefringent polymer (cured reactive mesogen) embossed Fresnel structures is shown in FIG. 6B. A master mould was used for the first example of a Fresnel zone lens, and this master was made by direct laser writing. However, in general an existing structure can be used for this process. The master is coated with a release layer and is moulded using UV-curable moulding material. This material is disposed on a flexible backing, which is a prerequisite for the present embossing process. The negative mould is then coated with an alignment layer and rubbed. The reactive mesogen is deposited on a ITO-covered glass, which has been treated with an alignment layer. The rubbed mould placed on the liquid RM and embossed using a rubber roller. After UV-curing the RM, the mould is removed and a copy of the master in RM is obtained. If the embossing process is optimized, the offset due to the imprinting technique may substantially vanish.

An embodiment of the invention provides a polarisation-independent device based on birefringent polymer (cured reactive mesogen) embossed Fresnel zone plates. The device consists of two substrates which each carries a Fresnel zone plate. As stated above, the lensing of the Fresnel zone lens relies on the alternating phase shift of $\pi/2$ thus it does not matter which zones—even or odd—exhibit this phase change. For better performance of the device, it is advantageous to use two substrates that are complementary structures (FIG. 3A). The birefringent polymer (cured reactive mesogen) layers are homogeneously aligned, the optical axes of the RM substrates are perpendicular to each other. Filled with a liquid crystal, this cell becomes a twisted nematic cell due to this perpendicular alignment. The employed liquid crystal is index matched to the RM, for both the ordinary and extraordinary indices.

The operating principle is summarized in FIG. 3A and FIG. 3B. In the field-off state, incident collimated light does not experience any distortion of the phase front as the birefringent polymer (cured reactive mesogen) and the liquid crystal have the same (or very similar) ordinary and extraordinary refractive indices. Hence, collimated light will remain collimated without focusing. However, due to the twisted geometry, each input polarisation is rotated by 90°. The use of the complementary structures on the top and bottom structures is intended to compensate for imperfect index matching. A spatial variation in the optical phase occurring at the top due to index mismatch will occur at the complementary places at the bottom and both will therefore be balanced.

In the field-on state at sufficiently high voltages (higher than the critical voltage), the liquid crystal's function of polarisation conversion stops, and the output polarisation is identical to the input polarisation. The reorientation of the liquid crystal director to a homeotropic state further stops the previously achieved index matching, and lensing at the top and bottom substrates emerges. Hence, lensing for both polarisations is achieved by this Fresnel lens cell. The complementary design of the Fresnel zone cell helps in achieving a more homogeneous electric field distribution throughout the device, which should reduce the voltage dependence.

The phase shift adopted due to the liquid crystal should therefore be constant throughout the lens so that the transverse phase modulation is solely determined by the birefringent polymer (cured reactive mesogen). It should be mentioned that the presented technique of achieving polarisation-independence is not limited to Fresnel zone plates but can be extended to a wide range of optical components, which will be shown later.

FIGS. 7a to 7d shows polarising optical micrographs of the RM embossed normal (a, b) and complementary (c, d) Fresnel zone plates (FZPs). Birefringent polymer (cured reactive mesogen) embossed substrates. (a, b) Normal structure between crossed polarisers with director in (a) 45° and (b) 0° angle with respect to polariser. FIG. 7(c, d) show complementary structure. Images are recorded at constant exposure times. FIG. 7(e-h) show an assembled cell with the director of both substrates perpendicular to each other. An unfilled cell between crossed polarisers is shown in at (e) a 45° angle with respect to polariser, and at (f) 0° angle. A filled (TN like) cell between is shown in FIG. 7(g) for crossed polarisers and in FIG. 7(h) for parallel polarisers. Both structures are accurate reproductions of the master and additionally exhibit very good alignment of the cured RM (for profile measurements see FIG. 13 and FIG. 14). The dark regions between the RM rings confirm that the embossing process produces structures with very small or zero offset as there is no visible birefringence. The dark state in FIG. 7(d) reveals some minor imperfections that are most likely caused be the rubbing process of a textured surface.

The normal and complementary FZPs are assembled into a cell with the director of the substrates being perpendicular to each other. The unfilled state of the cell is displayed in FIG. 7(e, f). Due to the complementary design, the cell appears almost homogeneously bright between crossed polarisers if the director assumes a 45° angle to the polariser [FIG. 7(e)]. Placed parallel to the polarisers, the sample exhibits a good dark state [FIG. 7(f)]. Filling the cell with a liquid crystal leads to a twisted nematic cell, which appears bright between crossed polarisers [FIG. 7(g)] and dark between parallel polarisers [FIG. 7(h)]. This confirms that the alignment of the RM is transferred well to the liquid crystal.

Figure 8:
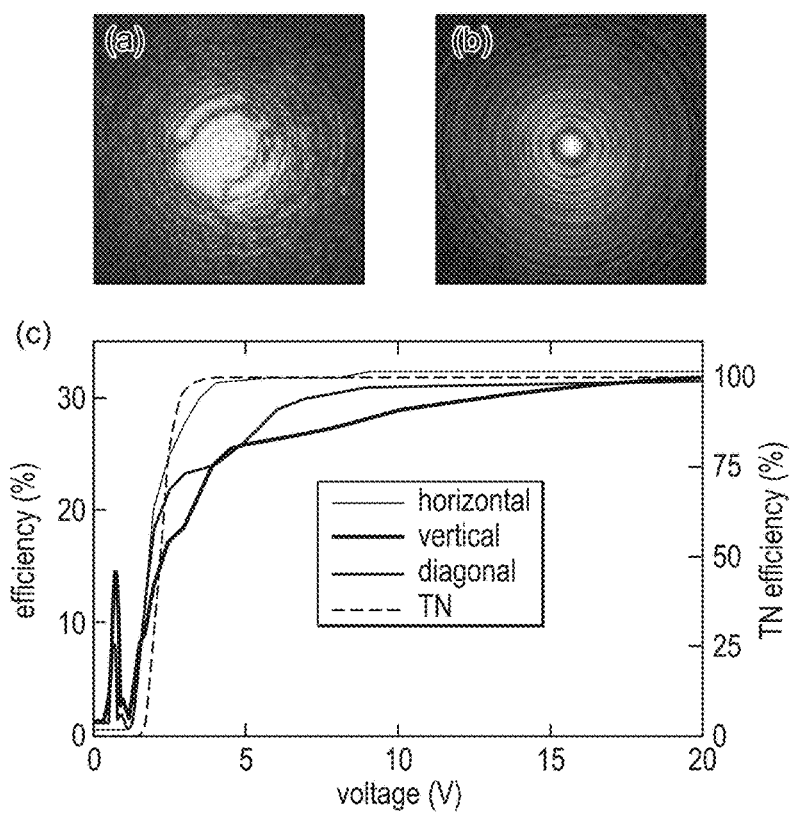
FIGS. 8($a$) to 8($c$) show transverse beam profiles of laser beams transmitted through a switchable optical modulator, and associated diffraction efficiency as a function of applied switching voltage.

FIG. 8(a, b) shows a collimated Gaussian beam with diagonal polarisation transmitted through the Fresnel zone plate cell. In the off-state, the beam remains collimated, however, small distortions arise from errors in the filled FZL cell. In the on-state, light is focused in a central spot.

In particular, FIG. 8 shows the measured transmission of a laser beam (wavelength=594 nm) through the Fresnel zone cell on a CCD camera in 20 cm distance: FIG. 8(a) shows the off-state and FIG. 8(b) shows the on-state (10V voltage applied). FIG. 8(c) shows the efficiency of power focused into the central spot for different input polarisations and transmission properties of a twisted nematic (TN) cell modelled according to the lens specification (black dashed line).

Figure 17:
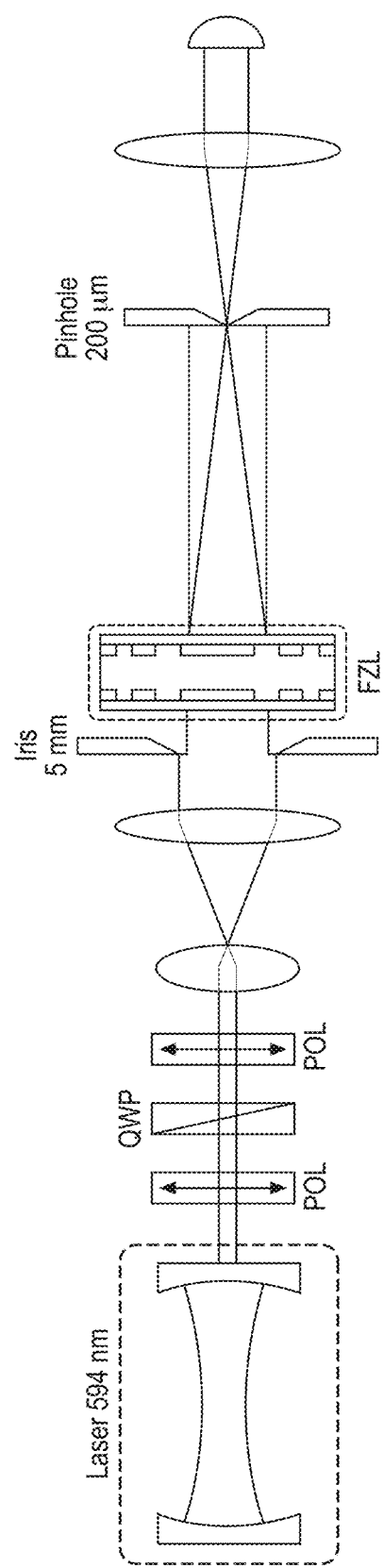
FIG. 17 schematically illustrates apparatus for measuring the diffraction efficiency of an optical modulator (Fresnel lens)

FIG. 8(c) shows the efficiency of the device for different input polarisations (for measurement setup see FIG. 17). The efficiency saturates to similar values of approximately 33% independent of the polarisation. However, while the horizontal polarisation saturates rapidly, the vertical polarisation starts out similar at low voltages but then exhibits a slower saturation. The diagonal polarised input gives an intermediate behaviour as it is a mixture of vertical and horizontal polarisation. The general switching behaviour closely resembles a twisted nematic cell, which has been plotted as a reference. Details on the simulation are as follows. The director profile was calculated using COMSOL Multiphysics 5.3. The Free energy being defined by:

$$2F(z)=K_{11}(n'_z)^2+K_{22}(n_yn'_z-n_xn_y)^2+K_{33}[n_z^2(n'_x+n'_y)+(n_xn'_x+n_yn'_y)^2]-E_z^2\epsilon_0(\Delta\epsilon n_z^2+\epsilon_\perp)$$

was implemented as the weak form with strong anchoring conditions. Here, $n_i$ are the components of the director $n=[n_x,n_y,n_z]^T$ in Cartesian coordinates (i=x, y, z), $K_{jj}$ are the elastic constants (j=1, 2, 3). $E_z$ designates the electric field in z-direction, $\epsilon_0$ the vacuum permittivity, $\Delta\epsilon$ the dielectric anisotropy and $\epsilon_\perp$ the perpendicular permittivity of the liquid crystal. The director field was then used to calculate the transmission of linear polarised light by applying the Jones formalism. Physical properties of the liquid crystal (MLC6204-000) were used for simulation as follows:

| Property | MLC-6204-000 | RMM1850 |
| --- | --- | --- |
| Elastic constant $K_{11}$ | 6.0 | — |
| Elastic constant $K_{22}$ | 4.3 (estimated) | — |
| Elastic constant $K_{33}$ | 15.2 | — |
| Dielectric constant parallel $\epsilon_\parallel$ | 44.8 | — |
| Dielectric constant perpendicular $\epsilon_\perp$ | 9.5 | 3.68 (cured) |
| Ordinary refractive index $n_o$ | 1.504 | 1.510 (uncured) |
| Extraordinary refractive index $n_e$ | 1.652 | 1.654 (uncured) |

Theoretically, a diffraction efficiency of ~41% is expected. There are three factors which negatively impact the diffraction efficiency. They are: the profile of the embossed structure, the effects of the sharp edges on the liquid crystal and the alignment quality of the birefringent polymer (cured reactive mesogen). From the profile of the embossed RM lens (FIG. 13), we see the embossed structure compared to that of the master.

Figure 9:
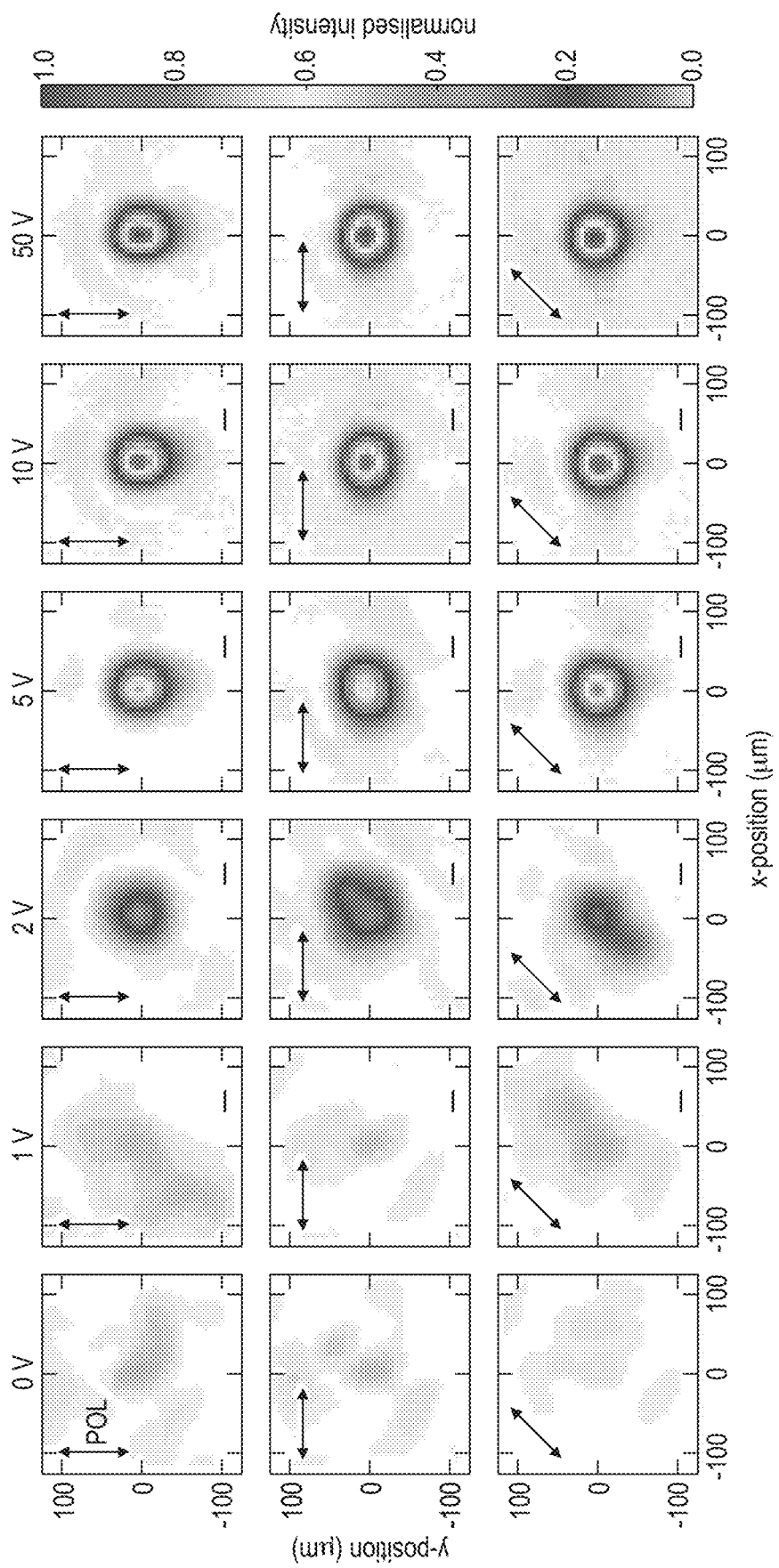
FIG. 9 shows transverse beam profiles of laser beams transmitted through a switchable optical modulator, and associated input optical beam polarisation states.

A more detailed investigation of the beam profile is shown in FIG. 9. This shows a series of transmitted laser beam profiles measured for different input polarisations (red arrow): vertical, horizontal, diagonal, at different applied switching voltages.

For different voltages applied between the two electrodes of the optical modulator, a central spot emerges which increases in intensity. For the different input polarisations (horizontal, vertical, diagonal), there is little variation in intensity or shape. A notably discrepancy, however, is that for the horizontal and the vertical polarisation the profile is elongated along the respective axis. This does not occur for the diagonal input, which fits the device design with the horizontal and vertical axes being principle axes of the lens. A diagonal polarised input is therefore split in equal parts horizontal and vertical, which compensates the ellipticity observed for the pure horizontal and vertical inputs.

Figure 10:
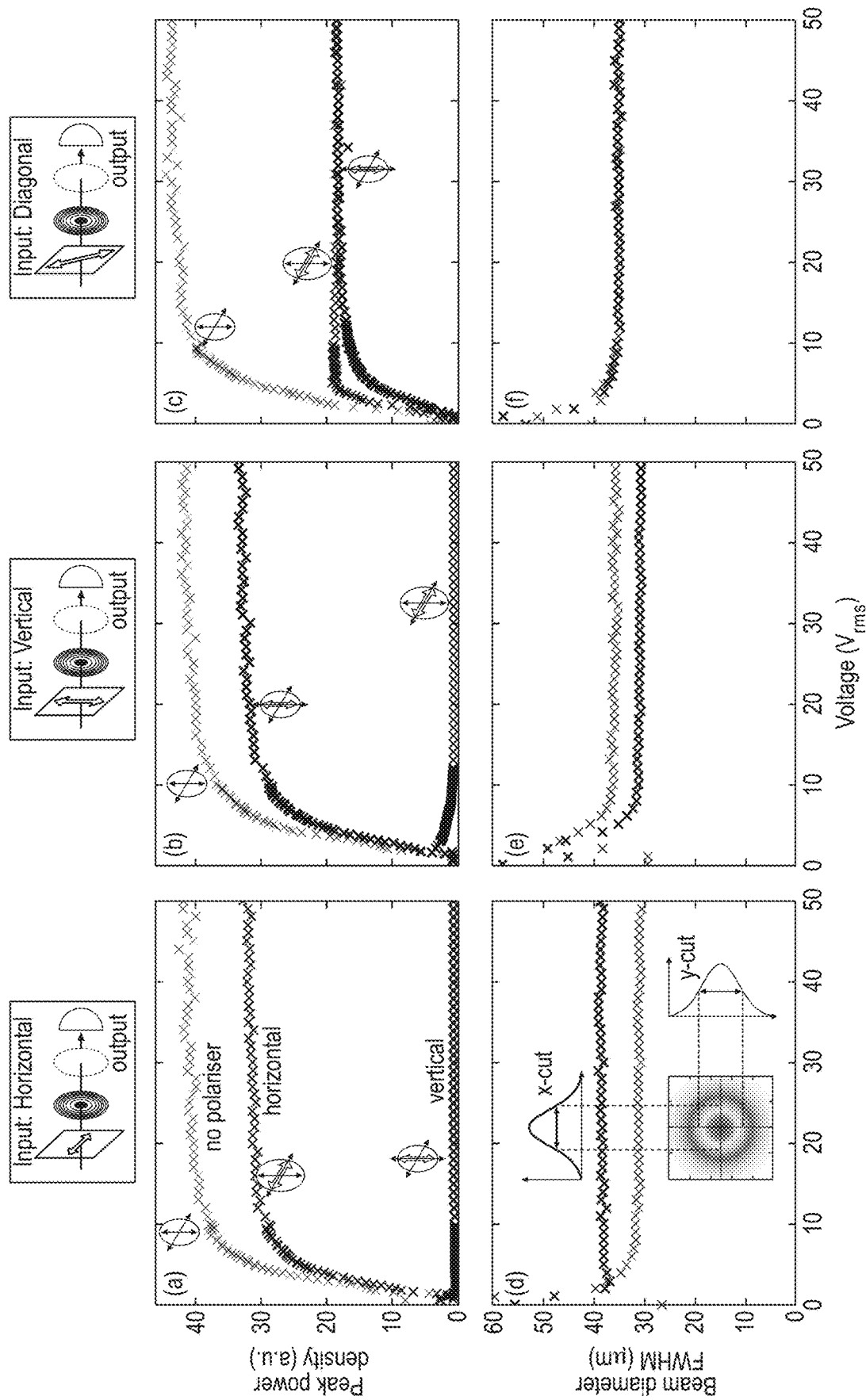
FIGS. 10($a$) to 10($c$), and 10($d$) to 10($f$) show, respectively, peak optical power values of an optical beam and optical beam diameter thereof, in respect of an optical bean transmitted by a switchable optical modulator.

FIG. 10 shows the voltage dependent peak intensity of the beam (FIG. 10(a-c)) and the beam widths (full width at half maximum, FWHM) for x- and y-cuts for different input polarisation. In particular, FIG. 10(a-c) shows the peak intensity of the central peak of a transmitted laser beam for different input and output polarisations as a function of applied switching voltage. FIG. 10(d-f) shows the voltage-dependent full width at half maximum found by x- and y-cut through peak position. Input polarisations are: FIG. 10(a,d) vertical; FIG. 10(b,e) horizontal; FIG. 10(c,f) diagonal.

The peak power density without an output polariser shows very similar behaviour as the efficiency measurements, after a steep increase a saturation quickly follows. The polarisation dependent output measurements show that the polarisation conversion due to the TN effect is stopped rapidly after the critical voltage is exceeded. Hence, the output polarisation corresponds to the input polarisation. The reduction in amplitude is caused by the polariser, which transmits ~80% of the incoming light. For the diagonal input, the polarised output shows equal parts horizontal and vertical polarised light. The horizontal component saturates faster than the vertical, which already has been observed in the efficiency measurements [FIG. 10(c)]

The beam diameter (full width at half maximum, FWHM) [FIG. 10(d-f)] decreases with increasing voltage due to the increased focusing. The ellipticity for the horizontally and vertically polarised input is clearly visible. Also, the compensation for the diagonal input is as expected from the 2D beam profiles (FIG. 10(d)). This is further supported by looking at the absolute values of the FWHM. For the diagonal, the beam width of 35 µm is very close to the larger diameter, 36 µm and 37 µm, which is found for the horizontal and vertical polarisations. As a comparison, the smaller diameters are about 30 µm.

The ellipticity is assumed to be caused by imperfect alignment close to the rims of the RM rings, which transfers to the alignment of the liquid crystal. In a perfectly aligned birefringent polymer (cured reactive mesogen) Fresnel zone lens, the RM director is uniformly aligned within the rings, which includes regions where the director is perpendicular on the ring edges. In reality however, a distortion at these edges is more likely to appear as the PVA treatment of the mould would promote planar anchoring at that position.

For horizontally polarised light, this means that along the horizontal axis, is less focused due to the decreased index contrast which leads to an increased spot size along this axis.

Figure 11:
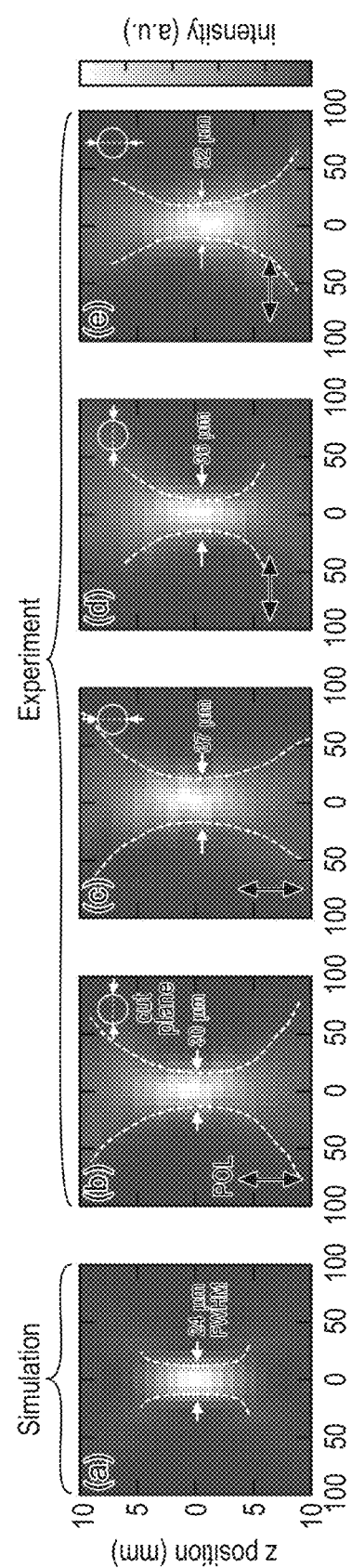
FIGS. 11($a$), and 11($b$) to 11($e$) show, respectively, simulated results and measured results illustrating a point spread function of a switchable optical modulator.

FIG. 11 shows z-scans of the focused laser beam around the focal spot. In particular, FIG. 8 shows the following z-scans of the point spread function for a Fresnel lens: FIG. 11(a) simulated; FIG. 11(b-e) experimentally determined at 10V applied switching voltage; Input light polarisations were: FIG. 11(b, c) horizontally; FIG. 11(d, e) vertically. The theoretical result [FIG. 11(a)] is based on a perfect binary phase distribution and a beam diameter (FWHM) of 24 µm. The smallest obtained values from the experiments are 30 µm and 32 µm [FIGS. 11(b) and (d)], both beam diameters are measured perpendicular to the input polarisation. As expected, the diameters parallel to the polarisation are significantly larger [FIGS. 11(c) and (e)].

Figure 15:
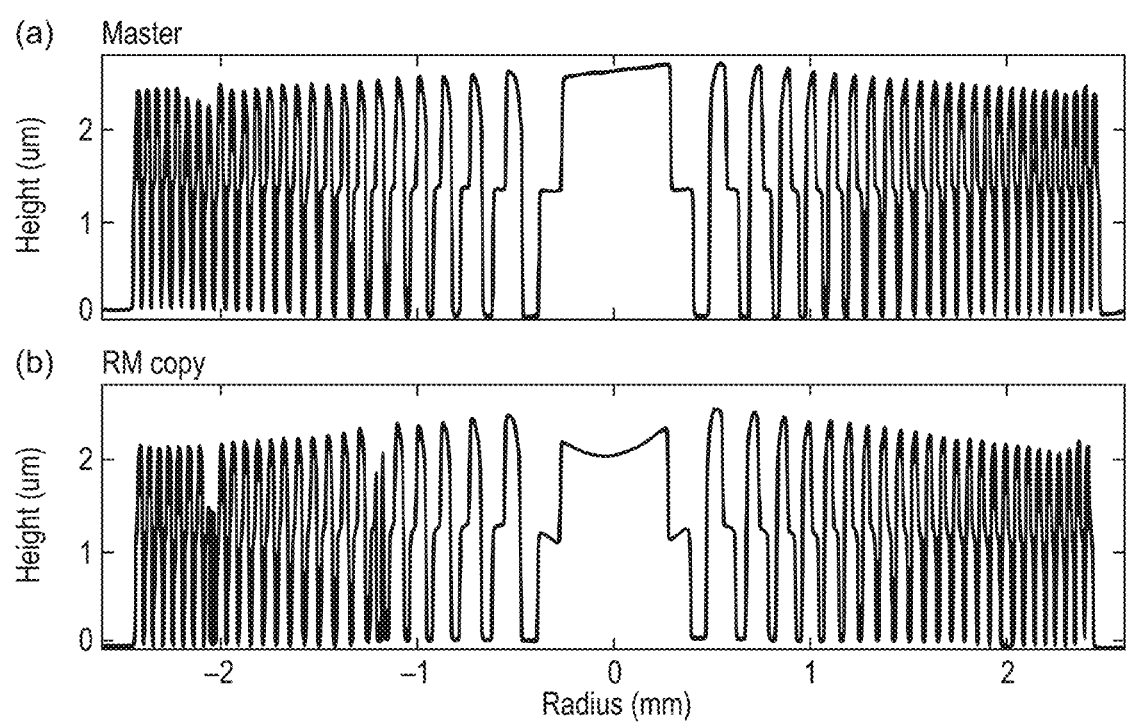
FIGS. 15($a$) and 15($b$) show the cross-sectional surface profiles of two Fresnel zone plates.

As mentioned before, the presented technique is not limited to simple Fresnel zone plates but can be used for many kinds of optical elements. First, to overcome the efficiency limitation of binary Fresnel lens we applied the embossing process together with the polarisation-independent design to multilevel Fresnel lenses [FIG. 12(a-c)]. The measured efficiencies for three-level design is 53%, which proves that this approach can exceed 50%. This still falls short of the theoretically predicted 68%, but we believe that by optimizing the technique the devices can get close to this efficiency (see FIG. 15 for surface profiles). FIG. 15 shows surface profiles of two three level Fresnel lenses: (a) Master fabricated in SU-8 on silicon, (b) reproduction in reactive mesogen (RM).

Figure 12:
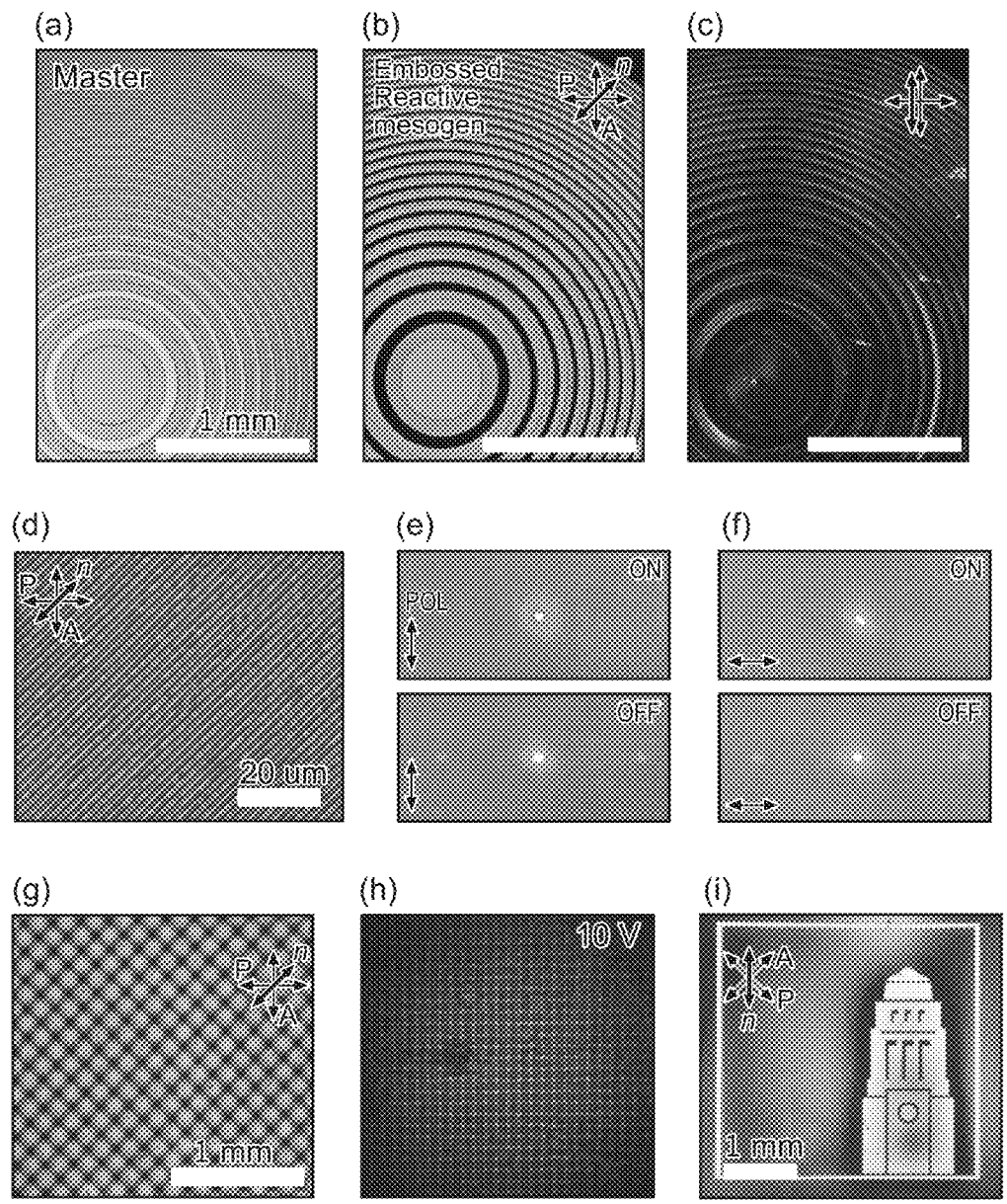
FIGS. 12($a$) to 12($i$) show, respectively: (a) a master mould for use in manufacturing an optical element; (b, c) an image of light transmitted through an optical element (Fresnel lens) embossed using the master mould of FIG. 12($a$), and observed according to two different optical polarisation states; (d, e, f) an image of an optical element (diffraction grating) embossed using a master mould, and optical diffraction patterns therefrom; (g, h, i) an image of an optical element (micro-lens array) embossed using a master mould, a view of the beam profile of a laser beam transmitted therethrough, and an image of a picture imaged through the micro-lens array.

FIG. 12 shows the following: FIG. 12(a-c) are optical microscope images of three-level Fresnel lens as follows: FIG. 12(a) master on silicon, FIG. 12(b, c) embossed lens substrate between crossed polarisers. FIG. 12(d) shows an embossed diffraction grating (2 um pitch, 125 nm amplitude) between crossed polarisers. FIG. 12(e, f) electrically switchable diffraction for different input polarisations. FIG. 12(g) shows an embossed microlens array (MLA) between crossed polariser. FIG. 12(h) is a camera image of a Gaussian laser beam focused by the MLA cell with a 10V switching voltage applied to the optical modulator. FIG. 12(i) shows an embossed picture viewed between crossed polarisers.

Two examples on reproducing existing optical elements are given in FIG. 12(d-h). In FIG. 12(d), a 1D grating has been embossed into RM by using commercially available grating film. In this instance, the process of moulding the master can be skipped. Using two such substrates—one with the director in the direction of the grooves, the other with the director perpendicular to the grooves—a switchable polarisation-independent grating has been produced [in FIG. 12(e, f)].

FIG. 12(g) displays a RM-reproduction of a micro-lens array (MLA), which is in general a more expensive component. To avoid damage to the MLA, it has been moulded in PDMS and then stamped in a hard resin to obtain the master for further processing.

Two birefringent polymer (cured reactive mesogen) reproductions were made, which were then assembled into a liquid crystal cell. The result of a switched-on MLA is shown in FIG. 12(h), which displays the focusing of a Gaussian laser beam with 45 degree input polarisation with respect to the RM director.

Figure 13:
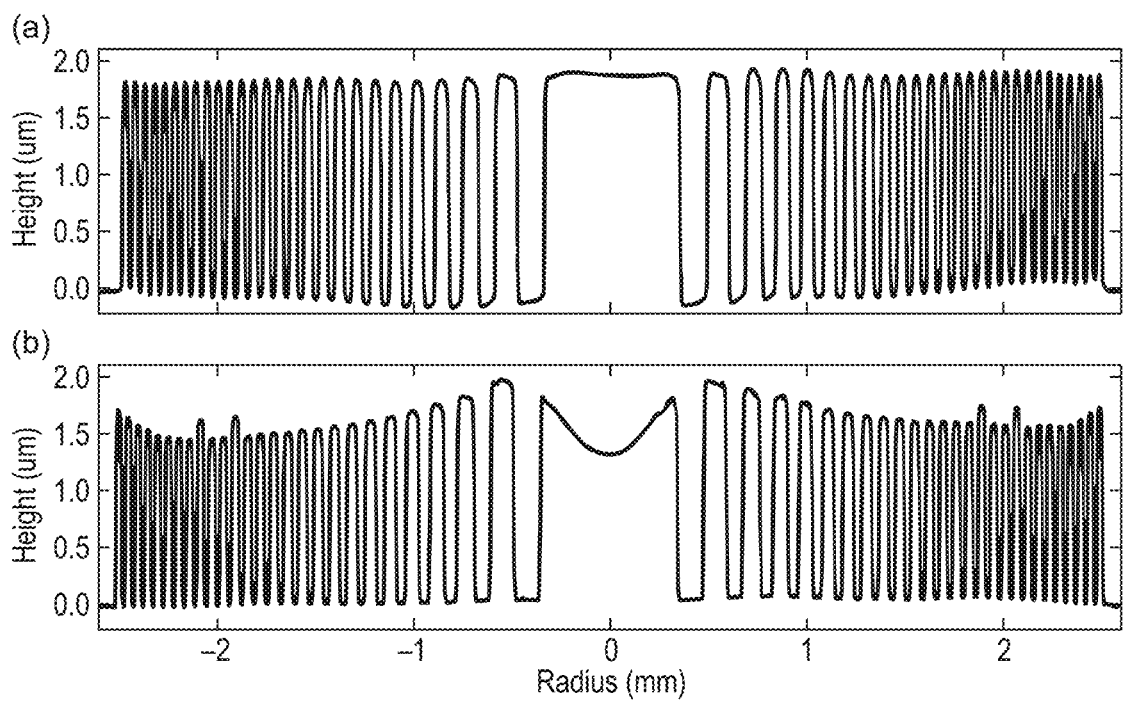
FIGS. 13($a$) and 13($b$) show the cross-sectional surface profiles of two Fresnel zone plates.
Figure 14:
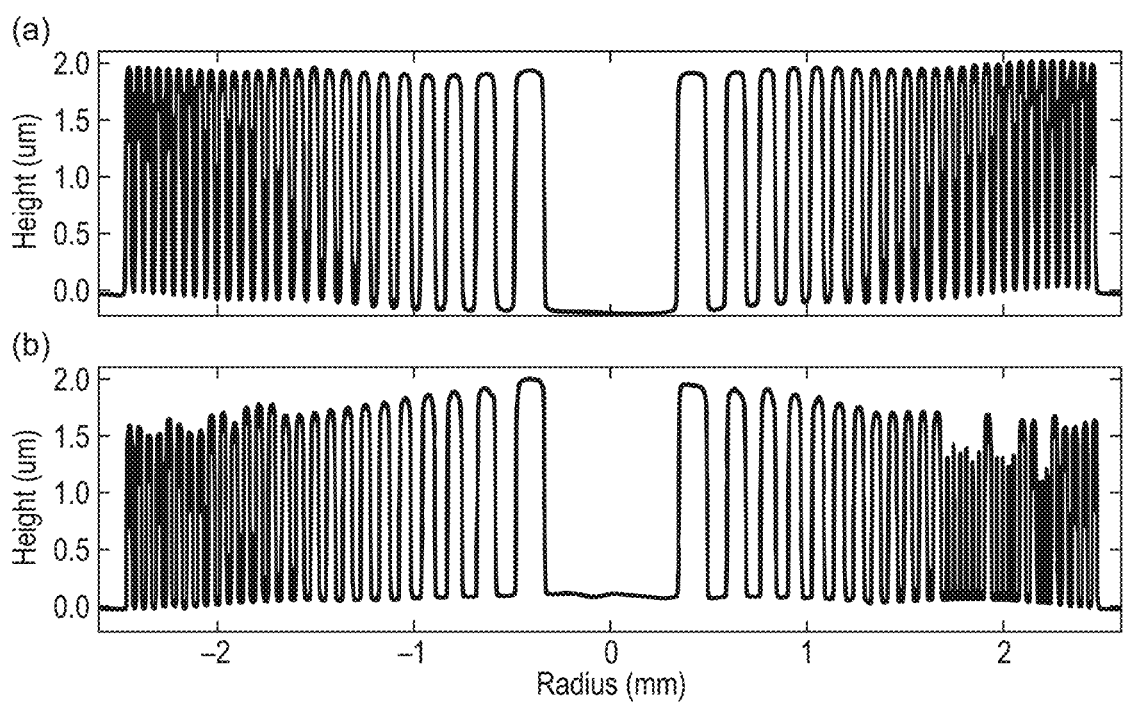
FIGS. 14($a$) and 14($b$) show the cross-sectional surface profiles of two Fresnel zone plates.
Figure 16:
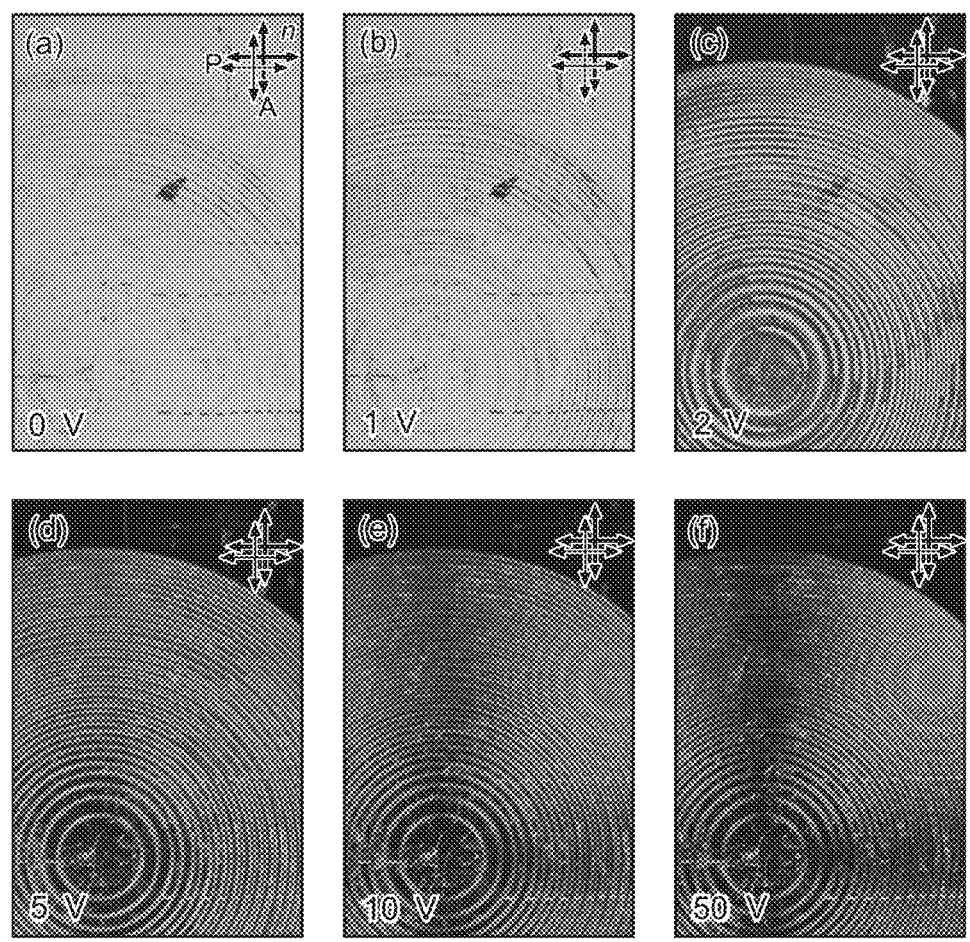
FIGS. 16($a$) to ($f$) show images of an electrically switchable optical modulator subject to different applied switching voltages.

FIG. 13 and FIG. 14 show the surface profiles of a two level Fresnel lens (FIG. 13) and a complementary two level Fresnel lens (FIG. 14), such as used in the example of FIG. 3: FIG. 14(a) Master fabricated in SU-8 on silicon, FIG. 14(b) reproduction in birefringent polymer (cured reactive mesogen) (RM). FIG. 16 shows a liquid crystal-filled two-level Fresnel lens, according to FIG. 3, between crossed polarisers at different applied switching voltages (0V, 1V, 2V, 5V, 10V and 50V). The director n (optic axis) of the reactive mesogen is aligned parallel to polariser (P)/analyser (A). FIG. 17 schematically shows the setup used for measuring the diffraction efficiency of the Fresnel lenses of embodiments of the invention (Figure annotation is as follows—POL: polariser, QWP: quarter wave plate, FZL: Fresnel Zone Lens, PD: photo diode).

Master Fabrication

In one example, the Fresnel lens has a focal length of 200 mm at 594 nm, an outer diameter of 5 mm and a nominal feature height of 2.1 µm. The latter is derived from the birefringence of the birefringent polymer (cured reactive mesogen) and the desired phase shift of Tr. Two versions of the zone plates are made: one normal structure where all odd zones are made from RM and a complementary structure with RM in the even zones. The Fresnel zone plate master is manufactured by using a direct writing laser system. SU-8-2025 (38% in cyclopentanone) on silicon spin coated 500 rpm (100 rpm/s) for 10 s and 1000 rpm (300 rpm/s) for 40 s. Dilution of the neat SU-8 is employed to adjust the film thickness. The sample soft-baked for 30 min at 30° C. The writing process is performed with a 375 nm (wavelength) laser with a nominal dose of 3000 mJ/cm2. The post exposure bake is done at 50° C. for 30 minutes. The master is developed by spin-coating SU-8 developer and then rinsed with IPA. Finally, a hard bake at 180° C. for 1 hour is performed. The feature height of 2.1 µm is verified by measuring the surface profile (Dektak XT).

For better release, the master is spin coated with a release layer consisting of Teflon AF1600 (1.7%) in FC40 (both Sigma Aldrich) at 500 rpm (100 rpm/s) for 10 s and 3000 rpm (300 rpm/s) for 40 s and dried at 180° C. for 15 min.

Mould Fabrication

The isotropic resin which is used to mould the master consists of 45% HDDA (Sigma Aldrich), 15% TMPTA (Sigma Aldrich) and 40% Actilane 420. The resin is deposited on the master, topped with flexible 125 um thick PET film (Melinex 506, HIFI films) and then cured at 10 mW/cm$^2$ UVA for 10 min.

After curing the film is lifted off and the cured resin adheres to the plastic backing. The mould is UV-ozoned for 5 min (T10X10/OES, UVOCS) before spin coating PVA solution (1% in $H_2O$) at 500 rpm (100 rpm/s) for 10 s and 1500 rpm (300 rpm/s) for 30 s.

The PVA layer is dried at 90° C. for 10 min and at 130° C. for 30 min. In a final step, the mould is rubbed using a rubbing machine equipped with a velvet cloth.

Substrate Preparation & Embossing

ITO substrates are thoroughly cleaned using different solvents and finished with a UV/ozone (T10X10/OES, UVOCS) treatment for 30 minutes. The samples are covered with a solution consisting of polyimide SE 3510 (66 wt %, Nissan Chemicals), dimethylformamide (33 wt %, Sigma Aldrich) and reactive mesogen RM257 (1 wt %, Merck) for alignment and adhesion. This solution is spin coated at 300 rpm (100 rpm/s) for 10 s and 3000 rpm (300 rpm/s) for 60 s and cured at 180° C. for 1 h. Finally, the samples are rubbed for planar alignment For the embossing, a droplet of reactive mesogen mixture RMM1850 (Merck Chemicals Ltd.) is deposited on the ITO substrate and the rubbed mould is placed on top. The embossing process is performed at a base plate temperature 85° C., 4.5 bar of roller pressure and substrate speed of 6.5 mm/s. After embossing, the sample is cooled to room temperature within a period of 5 minutes. The sample is UV-cured with a UV-A intensity of 10 mW/cm2 (measured with radiometer RM-12, Opsytec Dr Groebel GmbH) for 10 minutes. Finally, the film is removed leaving behind the reproduced structure.

Lens Assembly & Measurement

The normal and complementary Fresnel zone plate substrates are assembled into a cell such that the directors form a 90° angle. The alignment is performed by hand under a microscope to ensure good positioning of the structures. The cell gap is controlled by using Mylar spacers. The cell is sealed on three of the four sides to enable vacuum filling. This method of filling is necessary as capillary filling usually leads to air bubbles being trapped in the cell. The cell is filled with nematic liquid crystal MLC-6204-000.

After filling and electrically contacting, the cell is measured by using a HeNe laser ($\lambda$=594 nm) which has been expanded to a ~300 um diameter beam (FWHM). The output state is measured using a beam profiler (Thorlabs BC106N-VIS).

As discussed above, the optical modulating functions provided by the invention include, but are not limited to: lensing; focussing; defocussing; refracting, diffracting; beam steering. Preferably the optical modulation function, effect or action of the first optical element of the invention is substantially the same as the modulation function, effect or action of the second optical element of the invention.

For example, both may act as lenses, prisms, or diffraction gratings, which modulate a respective wave front so as to focus light or to diffract respective polarisation components of light substantially in the same way with substantially the same result. The following provide examples of uses of the invention.

Figure 20A:
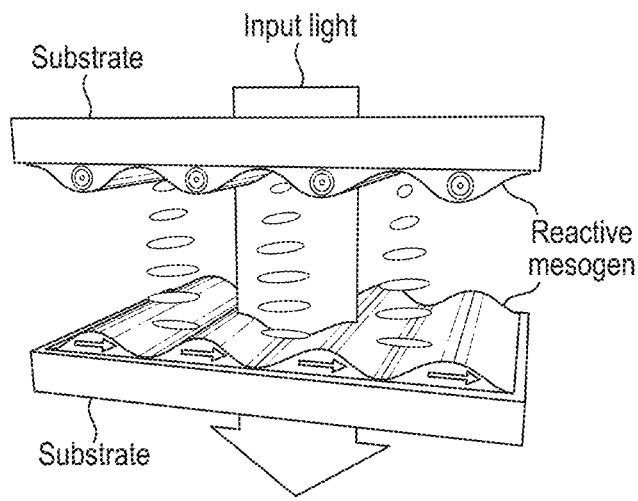
FIG. 20A and FIG. 20B show schematically a switchable polarisation-independent diffraction grating according to an embodiment of the invention.
Figure 20B:
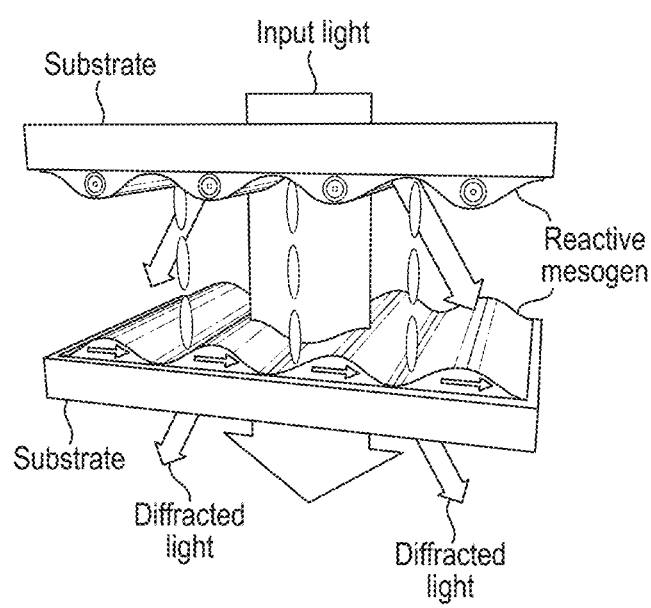

FIG. 20A and FIG. 20B show, schematically, a switchable polarisation-independent diffraction grating according to an embodiment of the invention comprising a birefringent first diffractive optical element, spaced from a birefringent second diffractive optical element by a liquid crystal. Each optical element is fabricated according to the method described herein with reference to FIG. 6B. In FIG. 20A the diffraction grating is in the "field off" state in which $n_o$ diffraction takes place and both interfaces (Reactive-Mesogen/Liquid-Crystal) are index matched. In FIG. 20B the diffraction grating is in the "field on" state in which both interfaces (Reactive-Mesogen/Liquid-Crystal) are not index matched such that different polarizations are diffracted at top/bottom interfaces.

Figure 21:
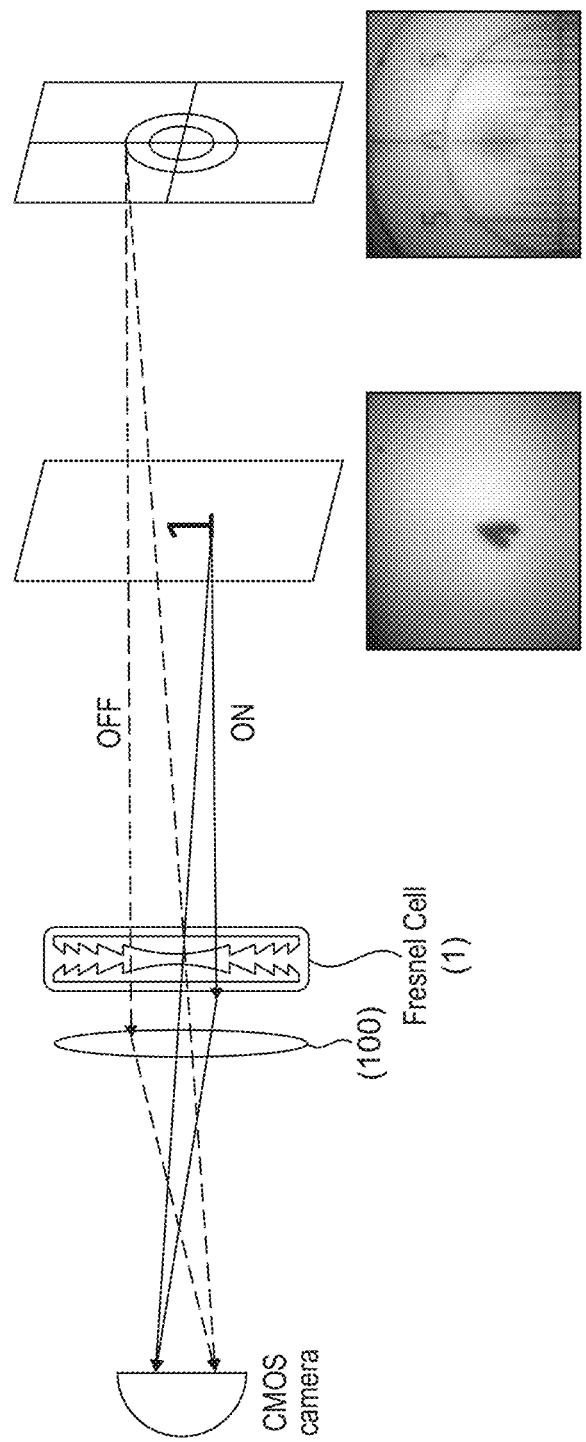
FIG. 21 schematically illustrates the use of a refractive lens of an embodiment of the invention in an imaging application.

FIG. 21 schematically illustrates the use of a refractive lens of an embodiment of the invention in an imaging application. When the Fresnel lens (1) is in the "field off" state ("OFF") in which both interfaces (Reactive-Mesogen/Liquid-Crystal) are index matched, the focal length of the lens (100) dominates image formation at the CMOS camera, of an imaged object (concentric rings and linear scale, printed on a sheet). However, when the Fresnel lens (1) is in the "field on" state ("ON") in which both interfaces (Reactive-Mesogen/Liquid-Crystal) are not index matched such that refraction takes place in the Fresnel lens (1), the focal length of the combination of the lens (100) and the Fresnel lens (1) dominates image formation at the CMOS camera, of an imaged object (printed number '1' on a sheet). The image formed at the CMOS camera is shown in FIG. 21, for each case, adjacent the imaged object in question.

Although a few preferred embodiments of the present invention have been shown and described, it will be appreciated by those skilled in the art that various changes and modifications might be made without departing from the scope of the invention, as defined in the appended claims. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An electrically switchable optical modulator for modulating an optical wavefront transmitted therethrough, comprising:
   a birefringent first optical element and a birefringent second optical element each having respective ordinary and extraordinary refractive indices;
   a birefringent liquid crystal material sandwiched between the first and second optical elements;
   wherein the extraordinary refractive index of the liquid crystal material is electrically switchable between:
   a first state in which it has a first value; and,
   a second state in which it has a second value different from the first value;
   wherein one or both of the first value and the second value is un-matched to the extraordinary refractive index of the first optical element in respect of light polarised in a first direction of linear polarisation, and is un-matched to the extraordinary refractive index of the second optical element in respect of light polarised in a second direction of linear polarisation orthogonal to the first direction, wherein a relative contrast in extraordinary refractive index as between the liquid crystal material and the first and second optical elements for modulating said wavefront is switchably rendered,
   wherein the first and second optical elements are formed from a reactive mesogen cured from a reactive state to form a birefringent polymer, wherein the reactive mesogen comprises a bi-functional acrylate system, and
   wherein the alignment of the reactive mesogen is maintained throughout the optical element formed from the reactive mesogen.

2. The electrically switchable optical modulator according to claim 1, wherein the first value is matched to the respective extraordinary refractive indices of both the first and second optical elements.

3. The electrically switchable optical modulator according to claim 1, wherein the ordinary refractive index of the liquid crystal material is matched to the respective ordinary refractive indices of both the first and second optical elements.

4. The electrically switchable optical modulator according to claim 1, in which the first and second optical elements define a director, wherein the director of the first optical element is transverse to the director of the second optical element.

5. The electrically switchable optical modulator according to claim 4, in which the liquid crystal material has a twisted nematic liquid crystal arrangement, wherein when in said first state an optic axis of the liquid crystal material:
   is aligned substantially parallel to the director of the first optical element; and,
   is aligned substantially parallel to the director of the second optical element.

6. The electrically switchable optical modulator according to claim 1, in which one or each of the first and second optical elements presents a curved surface to which said liquid crystal material complies.

7. The electrically switchable optical modulator according to claim 6, in which each of the first and second optical elements presents a surface relief pattern to which said liquid crystal material complies, wherein the pattern presented by the first optical element is substantially the same as the pattern presented by the second optical element.

8. The electrically switchable optical modulator according to claim 1, in which one or each of the first and second optical elements presents a surface relief pattern to which said liquid crystal material complies.

9. The electrically switchable optical modulator according to claim 8, in which each of the first and second optical elements presents a surface relief pattern to which said liquid crystal material complies, wherein the pattern presented by the first optical element is the reciprocal of the pattern presented by the second optical element.

10. The electrically switchable optical modulator according to claim 1, in which the first optical element opposes the second optical element.

11. The electrically switchable optical modulator according to claim 1, in which the first optical element defines a first optical axis and the second optical element defines a second optical axis which is substantially coaxial with the first optical axis.

12. The electrically switchable optical modulator according to claim 1, wherein the liquid crystal material is disposed between two separate electrodes configured to support between them an electrical field for switching the extraordinary refractive index of the liquid crystal material from said first state to said second state.

13. The electrically switchable optical modulator according to claim 12, wherein one or each of the first optical element and the second optical element is disposed between the two separate electrodes.

14. The electrically switchable optical modulator according to claim 12, wherein one of the two separate electrodes is disposed between the first optical element and the liquid crystal material.

15. The electrically switchable optical modulator according to claim 12, wherein one of the two separate electrodes is disposed between the second optical element and the liquid crystal material.

16. The electrically switchable optical modulator according to claim 1, wherein one or both of the optical elements is shaped to define an axis of cylindrical symmetry which is substantially perpendicular to a flat surface disposed on one side of the respective optical element.

17. The electrically switchable optical modulator according to claim 16, wherein both of the optical elements are shaped to define a respective said axis of cylindrical symmetry and the axis of cylindrical symmetry of the first and second optical elements are coaxial.

18. A method of manufacturing an optical modulator according to claim 1, wherein each birefringent optical element is provided according to a method comprising
providing a flexible sheet presenting an embossing surface embossed with shape which is reciprocal to said desired shape;
providing a quantity of a reactive mesogen material in an uncured state upon a surface of a substrate;
flexing the embossing surface to press against the quantity of reactive mesogen material progressively across a surface of the quantity of reactive mesogen material and forming a shaped birefringent part possessing said desired shape; and
curing the shaped birefringent part to form said birefringent optical element.

19. The method of manufacturing an optical modulator according to claim 18, in which the optical modulator is electrically switchable.

20. The method of manufacturing an optical modulator according to claim 19, comprising an electrically switchable liquid crystal material sandwiched between two said birefringent optical elements.

21. The method according to claim 18, including providing a preferential surface alignment to the embossing surface and therewith imparting the preferential surface alignment to the embossed surface of the shaped birefringent part, the surface alignment being configured to align said liquid crystal material.

22. An electrically switchable optical modulator for modulating an optical wavefront transmitted therethrough, comprising:
a birefringent first optical element and a birefringent second optical element each having respective ordinary and extraordinary refractive indices;
a birefringent liquid crystal material sandwiched between the first and second optical elements;
wherein the extraordinary refractive index of the liquid crystal material is electrically switchable between:
a first state in which it has a first value; and,
a second state in which it has a second value different from the first value;
wherein one or both of the first value and the second value is un-matched to the extraordinary refractive index of the first optical element in respect of light polarised in a first direction of linear polarisation, and is un-matched to the extraordinary refractive index of the second optical element in respect of light polarised in a second direction of linear polarisation orthogonal to the first direction, wherein a relative contrast in extraordinary refractive index as between the liquid crystal material and the first and second optical elements for modulating said wavefront is switchably rendered,
wherein the first and second optical elements are formed from a reactive mesogen cured from a reactive state to form a birefringent polymer, wherein the reactive mesogen comprises a bi-functional acrylate system,
wherein the alignment of the reactive mesogen is maintained throughout the optical element formed from the reactive mesogen, and
wherein the birefringent polymer has a positive birefringence.

* * * * *